(12) United States Patent
Arool Emmanuel et al.

(10) Patent No.: US 11,863,359 B1
(45) Date of Patent: Jan. 2, 2024

(54) SUBCARRIER PRE-EQUALIZATION TECHNOLOGY FOR FREQUENCY SELECTIVE FADING CHARACTERISTICS OF WIRELESS CHANNELS

(71) Applicant: Amazon Technologies, Inc., Seattle, WA (US)

(72) Inventors: Cyril Arokiaraj Arool Emmanuel, San Jose, CA (US); Satyabh Mishra, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 364 days.

(21) Appl. No.: 17/317,730

(22) Filed: May 11, 2021

(51) Int. Cl.
| | |
|---|---|
| H04L 25/03 | (2006.01) |
| H04L 27/36 | (2006.01) |
| H04L 27/26 | (2006.01) |
| H04L 25/02 | (2006.01) |
| H04B 7/0413 | (2017.01) |
| H04L 5/00 | (2006.01) |
| H04B 17/318 | (2015.01) |

(52) U.S. Cl.
CPC ..... *H04L 25/03891* (2013.01); *H04B 7/0413* (2013.01); *H04B 17/318* (2015.01); *H04L 5/0023* (2013.01); *H04L 25/0222* (2013.01); *H04L 27/2627* (2013.01); *H04L 27/36* (2013.01)

(58) Field of Classification Search
CPC ........... H04L 25/03891; H04L 25/0222; H04L 5/0023; H04L 27/2627; H04L 27/36; H04B 17/318; H04B 7/0413
See application file for complete search history.

(56) References Cited

U.S. PATENT DOCUMENTS

| | | | | |
|---|---|---|---|---|
| 7,768,998 B1 * | 8/2010 | Everson | ................. | H04L 12/66 370/468 |
| 8,149,810 B1 * | 4/2012 | Narasimhan | .......... | H04L 1/0001 455/452.2 |
| 8,675,779 B2 * | 3/2014 | Zeppetelle | .............. | H04L 27/10 375/259 |

(Continued)

OTHER PUBLICATIONS

U.S. Appl. No. 63/043,775 (Year: 2020).*
Frank, Joe. "Bandwidth criteria for phased array antennas." Phased array antennas (1972): 243-253.

*Primary Examiner* — Dung B Huynh
(74) *Attorney, Agent, or Firm* — Lowenstein Sandler LLP

(57) ABSTRACT

Technologies to improve throughput in wireless multiple-input-multiple-output (MIMO) and single-input-single-output (SISO) systems are described. A first device includes a baseband processor with an Orthogonal Frequency Division Multiplexing (OFDM) circuitry that uses a digital multi-carrier modulation scheme that defines a set of data subcarriers, a set of pilot subcarriers, and a direct current (DC) subcarrier to communicate data in a wireless channel between the first device and a second device. The baseband processor also includes subcarrier pre-equalization logic that receives, from the second device, feedback data indicative of a frequency selective fading characteristic of the wireless channel and adjusts a first amplitude value of a subset of the set of data subcarriers to a second amplitude value. Adjusting the first amplitude value to the second amplitude value reduces the frequency selective fading characteristic of the wireless channel.

18 Claims, 13 Drawing Sheets

(56) References Cited

U.S. PATENT DOCUMENTS

| | | | | |
|---|---|---|---|---|
| 8,743,713 B2* | 6/2014 | Terry | H04B 7/15535 | 370/252 |
| 9,332,582 B2* | 5/2016 | Ulupinar | H04W 76/15 | |
| 9,661,579 B1* | 5/2017 | Zhang | H04W 52/34 | |
| 10,785,704 B1* | 9/2020 | Emmanuel | H04L 27/2626 | |
| 11,050,589 B1* | 6/2021 | Roy | H04L 5/0091 | |
| 11,349,627 B2* | 5/2022 | Yi | H04L 5/143 | |
| 2002/0159550 A1* | 10/2002 | Jin | H04L 27/2624 | 375/346 |
| 2006/0056525 A1* | 3/2006 | Jain | H04L 27/26522 | 375/260 |
| 2006/0166634 A1* | 7/2006 | Ido | H04L 1/20 | 455/140 |
| 2006/0286946 A1* | 12/2006 | Akkarakaran | H04L 27/2624 | 455/562.1 |
| 2007/0159959 A1* | 7/2007 | Song | H04L 25/0226 | 370/208 |
| 2007/0223365 A1* | 9/2007 | Tsfaty | H04L 9/00 | 370/208 |
| 2007/0275727 A1* | 11/2007 | Lee | H04W 52/367 | 455/442 |
| 2008/0219372 A1* | 9/2008 | Hori | H04L 27/2614 | 375/261 |
| 2008/0299896 A1* | 12/2008 | Mohebbi | H04B 7/0894 | 455/8 |
| 2009/0016412 A1* | 1/2009 | Okamoto | H04J 13/10 | 375/147 |
| 2009/0196367 A1* | 8/2009 | Kim | H04W 52/54 | 375/260 |
| 2009/0207954 A1* | 8/2009 | Dai | H04J 3/0605 | 375/345 |
| 2009/0310690 A1* | 12/2009 | Lee | H03G 3/3078 | 375/345 |
| 2010/0014558 A1* | 1/2010 | Nieto | H04J 13/0048 | 375/E1.001 |
| 2010/0172452 A1* | 7/2010 | Tota | H04L 1/0021 | 375/345 |
| 2010/0177832 A1* | 7/2010 | Baliga | H04L 27/2614 | 375/260 |
| 2010/0214964 A1* | 8/2010 | Larsson | H04B 7/0417 | 455/63.1 |
| 2010/0227561 A1* | 9/2010 | Chakraborty | H04L 5/0085 | 455/67.11 |
| 2010/0272195 A1* | 10/2010 | Rao | H04L 27/2614 | 375/346 |
| 2010/0303130 A1* | 12/2010 | Moh | H04L 27/2628 | 375/135 |
| 2011/0111716 A1* | 5/2011 | Watanabe | H04W 56/001 | 455/232.1 |
| 2011/0158304 A1* | 6/2011 | Yang | H04W 52/10 | 375/285 |
| 2012/0140658 A1* | 6/2012 | Kanzaki | H04B 17/24 | 370/252 |
| 2012/0155307 A1* | 6/2012 | Turk | H04W 52/0238 | 370/252 |
| 2013/0022091 A1* | 1/2013 | Muralidhar | H04L 25/022 | 375/340 |
| 2013/0155883 A1* | 6/2013 | Bhattacharjee | H04W 48/16 | 370/252 |
| 2013/0156127 A1* | 6/2013 | Schilling | H04L 25/02 | 375/295 |
| 2013/0170534 A1* | 7/2013 | Weisman | H04L 25/03961 | 375/229 |
| 2013/0202060 A1* | 8/2013 | Nishikawa | H04L 27/04 | 375/300 |
| 2014/0112260 A1* | 4/2014 | Sorrentino | H04W 52/325 | 370/329 |
| 2014/0294111 A1* | 10/2014 | Zhang | H04W 52/241 | 375/267 |
| 2015/0006073 A1* | 1/2015 | Moshfeghi | G01S 1/02 | 342/450 |
| 2015/0009954 A1* | 1/2015 | Chang | H04L 27/2692 | 370/330 |
| 2015/0038156 A1* | 2/2015 | Kilpatrick, II | H04W 52/325 | 455/561 |
| 2015/0200722 A1* | 7/2015 | Kang | H04B 7/1555 | 370/315 |
| 2016/0011296 A1* | 1/2016 | Keegan | G01S 5/02 | 370/252 |
| 2016/0013883 A1* | 1/2016 | Lv | H04L 25/03006 | 370/201 |
| 2016/0029331 A1* | 1/2016 | Seo | H04L 5/0048 | 370/350 |
| 2016/0127098 A1* | 5/2016 | Ng | H04L 5/001 | 370/329 |
| 2016/0142186 A1* | 5/2016 | Hong | H04B 7/0617 | 375/267 |
| 2016/0156750 A1* | 6/2016 | Zhang | H04L 27/2613 | 370/338 |
| 2016/0233998 A1* | 8/2016 | Sun | H04B 17/336 | |
| 2016/0294521 A1* | 10/2016 | Au | H04L 27/26412 | |
| 2016/0315681 A1* | 10/2016 | Moon | H04W 74/0816 | |
| 2016/0323070 A1* | 11/2016 | Chen | H04L 1/1896 | |
| 2017/0070298 A1* | 3/2017 | Elgala | H04B 10/5161 | |
| 2017/0214559 A1* | 7/2017 | Berardinelli | H04L 25/03006 | |
| 2017/0223665 A1* | 8/2017 | Chun | H04B 7/0695 | |
| 2017/0230954 A1* | 8/2017 | Au | H04L 5/005 | |
| 2017/0238286 A1* | 8/2017 | Chun | H04W 72/21 | 370/329 |
| 2017/0331670 A1* | 11/2017 | Parkvall | H04B 7/0695 | |
| 2018/0054786 A1* | 2/2018 | Yamada | H04W 24/10 | |
| 2018/0146465 A1* | 5/2018 | Li | H04L 27/2605 | |
| 2018/0191369 A1* | 7/2018 | Yamazaki | H04L 27/2634 | |
| 2019/0007152 A1* | 1/2019 | Yi | H04L 5/0028 | |
| 2019/0044583 A1* | 2/2019 | Garcia | H04B 17/309 | |
| 2019/0044782 A1* | 2/2019 | Zeng | H04L 27/26025 | |
| 2019/0074876 A1* | 3/2019 | Kakishima | H04L 5/005 | |
| 2019/0075003 A1* | 3/2019 | Wang | H04L 27/2607 | |
| 2019/0075006 A1* | 3/2019 | Yi | H04W 72/0446 | |
| 2019/0273590 A1* | 9/2019 | Becker | H04L 5/0044 | |
| 2019/0305877 A1* | 10/2019 | Lee | H04W 74/00 | |
| 2019/0320344 A1* | 10/2019 | Matsumura | H04L 5/0055 | |
| 2020/0266908 A1* | 8/2020 | Qian | H04L 5/0094 | |
| 2021/0119673 A1* | 4/2021 | Chen | H04B 7/0452 | |
| 2021/0167996 A1* | 6/2021 | Ratnam | H04L 27/2649 | |
| 2021/0184731 A1* | 6/2021 | Murakami | H04B 7/0417 | |
| 2021/0194569 A1* | 6/2021 | Ray Chaudhuri | H04B 7/15507 | |
| 2021/0377089 A1* | 12/2021 | Gaal | H04L 27/2618 | |
| 2021/0385770 A1* | 12/2021 | Zhang | H04W 56/0015 | |
| 2021/0409249 A1* | 12/2021 | Chen | H04L 5/0048 | |
| 2021/0410082 A1* | 12/2021 | Salaun | H04L 5/04 | |
| 2022/0029772 A1* | 1/2022 | Wu | H04W 72/0453 | |
| 2022/0104146 A1* | 3/2022 | Panje | H04W 84/18 | |
| 2022/0217724 A1* | 7/2022 | Pezeshki | H04L 5/0048 | |
| 2022/0278809 A1* | 9/2022 | Papasakellariou | H04L 1/1861 | |
| 2022/0377744 A1* | 11/2022 | Zhang | H04L 5/0053 | |

* cited by examiner

SUBCARRIER PRE-EQUALIZATION TECHNOLOGY FOR FREQUENCY SELECTIVE FADING CHARACTERISTICS OF WIRELESS CHANNELS

BACKGROUND

A large and growing population of users enjoy entertainment by consuming digital media items, such as music, movies, images, electronic books, etc. The users employ various electronic devices to consume such media items. Among these electronic devices (referred to herein as user devices) are electronic book readers, cellular telephones, personal digital assistants (PDAs), portable media players, tablet computers, netbooks, laptops, and the like. These electronic devices wirelessly communicate with a communications infrastructure to enable the consumption of digital media items. In order to wirelessly communicate with other devices, these electronic devices include one or more antennas.

BRIEF DESCRIPTION OF DRAWINGS

The present embodiments will be understood more fully from the detailed description given below and from the accompanying drawings of the present disclosure, which, however, should not be taken to limit the present embodiments, but are for explanation and understanding only.

DETAILED DESCRIPTION

Figure 1:
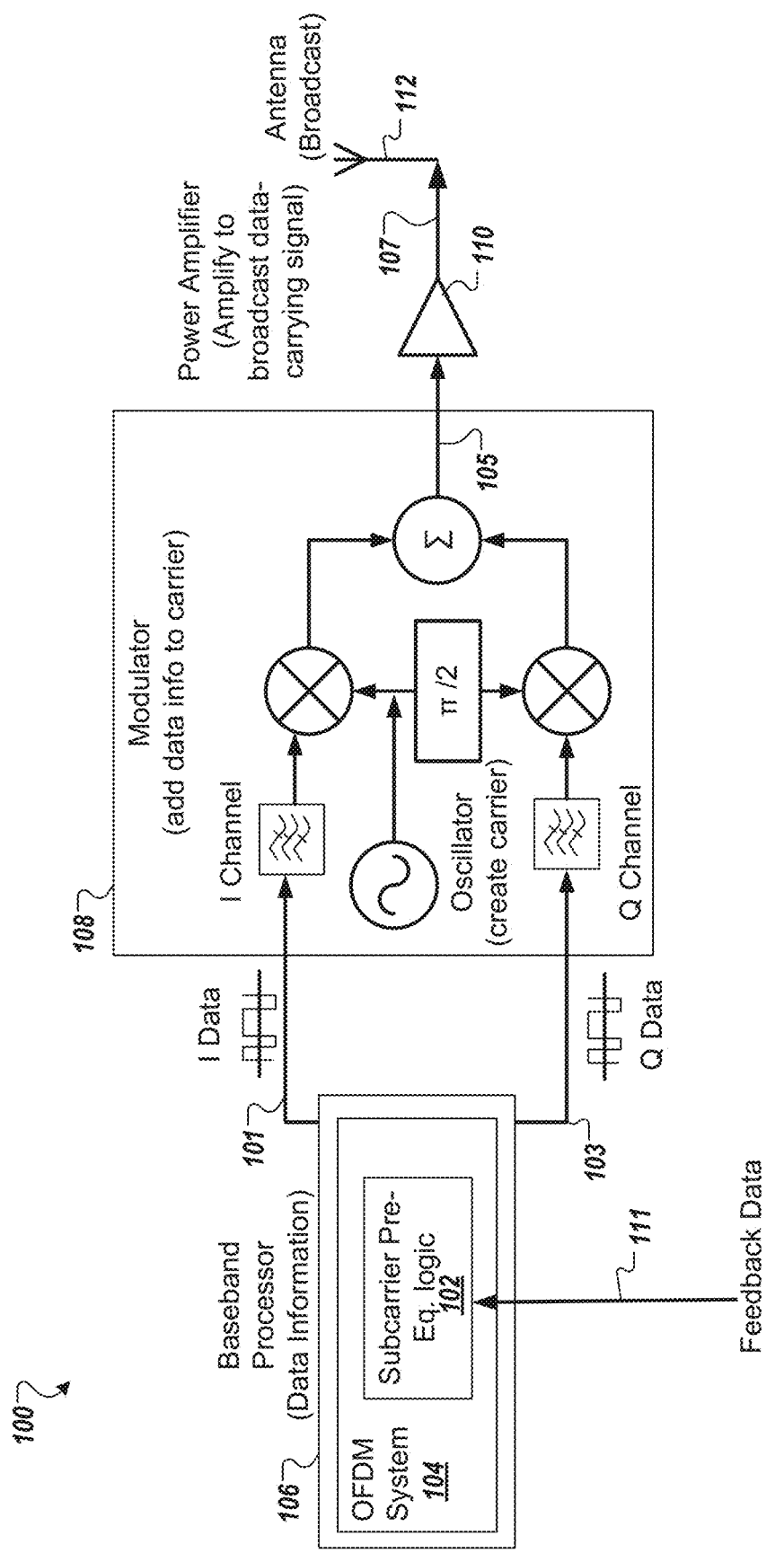
FIG. 1 is a block diagram of an electronic device with subcarrier pre-equalization digital signal processing (DSP) logic of an Orthogonal Frequency Division Multiplexing (OFDM) system to improve a frequency selective fading characteristic of a wireless channel according to one embodiment.

Technologies to improve throughput in wireless MIMO and single-input-single-output (SISO) systems are described. Wireless systems like wireless local area network (WLAN), LTE, 5G, Next Radio (NR) MIMO systems leverage spatial multiplexing capabilities of the wireless propagation channel and usually employ larger channel bandwidths. For example, IEEE802.11n/ac/ax use 20, 40, 80, and 80+80 MHz channel bandwidths, LTE-Advanced uses a 100 MHz channel bandwidth, LTE-AdvancedPro uses a 640 MHz channel bandwidth, 5G NR: FR1 uses a 100 MHz channel bandwidth, 5G NR: FR2 uses an 800 MHz channel bandwidth to provide higher throughputs than other wireless systems. However, these larger bandwidth systems suffer from frequency selective fading characteristics of the wireless channel due to time dispersion effects, resulting in larger variations in signal-to-noise ratio (SNR) at the receiver. These wireless channel impairments are more pronounced at 5G NR mmWave bands (24 GHz to 40 GHz). Frequency selective fading characteristics cause an imbalance in the received signal power levels at the MIMO radio receivers, causing variations in SNRs that lead to a lower modulation and coding scheme (MCS) rate or a physical layer (PHY) rate. Lower MCS or PHY rate results in lower throughput (and higher airtime occupancy), causing network congestion, degrading the throughput, and increasing latency.

Conventional rate adaptation techniques, such as transmit beamforming (TxBF) or specific time block coding (STBC), provide link robustness as long as a client device operates in a MIMO mode and requires channel state information (CSI) feedback to the transmitter. However, when an RF link gets weaker (e.g., the client device is too far away), the client device would transition out of the MIMO mode to operate in other modes at lower legacy rates. Under these conditions of weaker RF links, existing rate adaptation techniques toggle the RF link to the lowest PHY rate, just enough to sustain the RF link but with extremely low, practically unusable throughputs. The client devices in these other modes still have the larger bandwidth but drastically reduce the overall system throughput because of the dependence on the wireless propagation channel's characteristics. While it is possible to increase the transmit power at the AP or base station, the RF link is predominantly dictated by the transmit power at the client (e.g., ACKs), which impacts the client device's battery life.

Aspects and embodiments of the present disclosure address these and other challenges by providing subcarrier pre-equalization digital signal processing (DSP) techniques. Aspects and embodiments of the present disclosure can provide a subcarrier pre-equalization at a transmitter based on feedback from a receiver. The receiver measures and sends feedback to the transmitter with the estimated received signal power levels on a per subcarrier basis (spectral profile differences). The transmitter baseband circuitry adjusts the specified subcarrier(s)' amplitude corresponding to the instantaneous feedback from the receiver. Aspects and embodiments of the present disclosure can ensure higher throughput in MIMO mode or SISO mode, especially at the range conditions. Aspects and embodiments of the present disclosure can maintain the same link margins while enabling lower transmit powers of an AP/Base Station and/or client devices, improving battery life.

In at least one embodiment, a first device includes a baseband processor with an Orthogonal Frequency Division Multiplexing (OFDM) circuitry (also referred to herein as OFDM block or OFDM system) that uses a digital multi-carrier modulation scheme that defines a set of data subcarriers, a set of pilot subcarriers, and a direct current (DC) subcarrier to communicate data in a wireless channel between the first device and a second device. The baseband processor also includes subcarrier pre-equalization logic that receives, from the second device, feedback data indicative of a frequency selective fading characteristic of the wireless channel and adjusts a first amplitude value of a subset of the set of data subcarriers to a second amplitude value. Adjusting the first amplitude value to the second amplitude value reduces the frequency selective fading characteristic of the wireless channel. In at least one embodiment, the second device includes a receiver with estimation logic that measures a first fast Fourier transform (FFT) response of RF signals across a set of data subcarriers at a first receiver and a second FFT response of the RF signals across the set of data subcarriers at a second receiver. The estimation logic determines, from the first FFT response and the second FFT response, that a subset of the set of data subcarriers have power levels that are lower than a threshold value, the threshold value representing a frequency selective fading characteristic of the wireless channel between the first device and the second device. The threshold value can be expressed in terms of a threshold physical (PHY) rate of the channel. The estimation logic generates a gain code coefficient for the subset of the set of data subcarriers and sends the gain code coefficient to the first device. The gain code coefficient causes the first device to adjust the first amplitude value to the second amplitude value to reduce the frequency selective fading characteristic of the wireless channel.

Although various embodiments are described below with respect to WLAN technologies, such as the Wi-Fi® technology, the embodiments described herein can be used in other wireless technologies, such as personal area network (PAN) technologies (e.g., Bluetooth® and Zigbee® technologies), wireless area network (WAN) technologies, such as cellular technologies including Long Term Evolution (LTE) frequency bands, fourth-generation (4G) frequency bands, or the like. Similarly, although various embodiments are described below with respect to OFDM, the embodiments described herein can be used in connection with other multi-carrier modulation schemes.

FIG. 1 is a block diagram of an electronic device 100 with subcarrier pre-equalization logic 102 of an OFDM system 104 to improve a frequency selective fading characteristic of a wireless channel according to one embodiment. The electronic device 100 includes a baseband processor 106, including the OFDM system 104 with the subcarrier pre-equalization logic 102. The electronic device also includes a modulator 108, a power amplifier 110, and an antenna 112.

The OFDM system 104 includes a digital signal processing logic (e.g., hardware, software, or any combination thereof) that implements a digital multi-carrier modulation scheme—OFDM scheme. The OFDM scheme extends a single subcarrier modulation concept by using multiple subcarriers within the same single channel. Rather than transmitting a high-rate stream of data with a single subcarrier, OFDM uses a number of closely spaced orthogonal subcarriers transmitted in parallel. Each subcarrier is modulated with a digital modulation scheme, such as QPSK, 16QAM, etc.) at a low symbol rate. The combination of many subcarriers enables similar data rates as single-carrier modulation schemes with similar bandwidths. In the OFDM system 104, different information streams are mapped onto separate parallel frequency channels. Each channel is separated from the others by a frequency guard band to reduce interference between adjacent channels. So, in OFDM system 104, multiple subcarriers carry the information stream, and the data subcarriers are orthogonal to each other. The guard interval is added to each symbol to minimize the channel delay spread and inter-symbol interference. In the digital domain, the OFDM system 104 can map digital modulated input data, referred to as data symbols, onto orthogonal subcarriers. The data symbols are frequency-domain input data, such as complex numbers representing the modulated subcarriers. The OFDM system 104 converts the data symbols to the time-domain output data representing the analog OFDM symbol waveforms. In the illustrated embodiment, the OFDM system 104 outputs the OFDM symbol waveforms as I data 101 and Q data 103 to the modulator 108. In general, the modulator 108 receives the output data from the OFDM system 104, modulates the output data to add the output data to a carrier signal to obtain a data-carrying signal 105. The data-carrying signal 105 is output by the modulator 108 to the power amplifier 110 that amplifies the data-carrying signal 105 to broadcast the data-carrying signal 105 as an RF signal 107 via the antenna 112.

In at least one embodiment, the OFDM system 104 includes the subcarrier pre-equalization logic 102. The subcarrier pre-equalization logic 102 receives feedback data 111 from a second device with which the electronic device 100 is communicating. The feedback data 111 can include received signal power levels at one or more receivers of the second device on a subcarrier basis. The information can include the spectral profile differences between receivers on a subcarrier basis. Using the feedback data 111, the subcarrier pre-equalization logic 102 adjusts the specific subcarriers' amplitudes corresponding to the second device's instantaneous feedback. In at least one embodiment, the second device provides feedback data 111 to the subcarrier pre-equalization logic 102 whenever there is a change in received signal spectral profile due to changes in the wireless channel conditions. For example, if the wireless channel conditions meet a specified criterion, such as exceeding a predefined threshold, the second device can send the feedback data 111 to the subcarrier pre-equalization logic 102 to adjust the corresponding subcarriers' amplitude.

In at least one embodiment, the electronic device 100 sends the first data to the second device using a set of data subcarriers in a wireless channel. The set of data subcarriers operate at a first amplitude value. For example, the I data 101 and the Q data 103 have data with the first amplitude value. The subcarrier pre-equalization logic 102 can receive the feedback data 111 include one or more values, each value corresponding to a received signal power level of one of the multiple data subcarriers. For example, the feedback data 111 includes a first value indicative of a first received signal power level corresponding to a first data subcarrier and a second value indicative of a second received signal power level corresponding to a second data subcarrier. In at least one embodiment, the feedback data 111 includes one or more values indicative of an estimated received signal power level on a per data subcarrier basis. Alternatively, the feedback data 111 includes a first value indicative of a first received signal power level corresponding to a first data subcarrier at a first receiver of the second device and a second value indicative of a second received signal power level corresponding to the first data subcarrier at a second receiver of the second device. The values of the feedback data 111 can be used to adjust one or more data subcarriers to operate at a second amplitude value that is different than the first amplitude value (e.g., an increased value).

The subcarrier pre-equalization logic 102 adjusts corresponding ones of the data subcarriers to operate at the second amplitude value. For example, a first data subcarrier can be adjusted to operate at the second amplitude value, and a second data subcarrier can be maintained to operate at the first amplitude value. After adjusting the amplitude values of one or more of the data subcarriers, the electronic device 100 sends additional data to the second device using both the first amplitude value and the second amplitude values for corresponding data subcarriers. For example, the electronic device 100 sends the additional data with the second amplitude value for the first data subcarrier and the first amplitude value for the second data subcarrier. The subcarrier pre-equalization logic 102 ensures higher throughput in a MIMO mode of operation or even when the second device operates in SISO mode, specifically at range conditions. The subcarrier pre-equalization logic 102 enables the use of lower transmit powers of the electronic device 100 (e.g., AP/Base station), the second device (e.g., client device), or both. The lower transmit powers can improve the battery life of the devices while maintaining the same link margin.

In at least one embodiment, the baseband processor 106 performs bit-level processing on input bits to generate quadrature amplitude modulation (QAM) symbols or phase-shift keying modulation (PSK) symbols. The symbols can be discrete time-domain data in the I data 101 and Q data 103. To perform the symbol-level processing, the baseband processor 106 can perform an inverse fast Fourier transform (IFFT) of the symbols. In at least one embodiment, the first amplitude value is increased to the second amplitude value before the IFFT of the symbols.

In one embodiment, the subcarrier pre-equalization logic 102 can provide control information (e.g., control signals, instructions, commands, or the like) to other blocks of the OFDM system 104 to modify an amplitude parameter of one or more of the OFDM system 104. For example, an OFDM parameter structure can specify an amplitude value for each of the data subcarriers. Alternatively, the OFDM system 104 can include one or more registers that identify which subcarriers should be increased, decreased, or otherwise adjusted. The parameter information of the OFDM parameter structure can also include total bandwidth (BW), operating bandwidth (OBW), subcarrier spacing, information rate, modulation, coding rate, total subcarriers, data subcarriers, pilot subcarriers, and direct current (DC) subcarrier. The OFDM parameter structure's parameter information can be modified by the subcarrier pre-equalization logic 102 to modify the operation of the OFDM system 104 to control amplitude values for a subset of the data subcarriers.

The electronic device 100 can also include additional components, such as one or more processors (e.g., a host processor or central processing unit (CPU), one or more graphics processors, input-output (I/O) devices, memory devices, storage devices, or the like. The baseband processor 106 can include additional components, such as a processing device that can execute operations to implement the processing logic of the subcarrier pre-equalization logic 102. Alternatively, the subcarrier pre-equalization logic 102 can be implemented as hardware, such as a hardware state machine that receives one or more inputs, changes to one or more states based on the inputs, and outputs one or more control signals based on the current state. In some cases, the functionality of the subcarrier pre-equalization logic 102 can be integrated into or in connection with the OFDM system 104. The baseband processor 106 can include one or more interfaces, such as a serial interface (e.g., I2C interface) that can be used by the subcarrier pre-equalization logic 102 to generate one or more control signals to control the OFDM system 104, the power amplifier 110, or any combination thereof. The baseband processor 106 can include one or more interfaces with a host processor to communicate status, data, whether a transmitter is active, which transmitter is active, modulation and coding scheme (MCS) information, or the like. In another embodiment, the baseband processor 106 includes an interface to receive the feedback data 111 or other data indicative of received signal strength at one or more receivers of the second device, as described herein.

In other embodiments, the electronic device 100 is an access point (AP), which provides access to the Internet, a private network, or other public networks. In another embodiment, the electronic device 100 is a base station (BS), which connects to one or more relay stations (RL), one or more gateways (GWs), one or more customer premises equipment (CPE) devices, or the like. The electronic device 100 may be any content rendering device that includes a modem for connecting the user device to a network. Examples of such electronic devices include electronic book readers, portable digital assistants, mobile phones, laptop computers, portable media players, tablet computers, cameras, video cameras, netbooks, notebooks, desktop computers, gaming consoles, Blu-ray® or DVD players, media centers, drones, audio-input-enabled devices, speech-based personal data assistants, and the like. The electronic device 100 may also be an audio-input-enabled device, such as the Amazon Echo device, developed by Amazon Technologies, Inc. of Seattle WA. Alternatively, the electronic device 100 may be a set-top box (STB) or other media streaming device. The electronic device may connect to a network to obtain content from a server computing system (e.g., an item-providing system) or perform other activities. The electronic device may connect to one or more different types of cellular networks. In some embodiments, the electronic device 100 connects to an access point (AP), which provides access to the Internet, a private network, or other public networks.

The electronic device 100 includes a circuit board, such as a printed circuit board (PCB) upon which one or more of the components described above is disposed. The components can be integrated into one or more integrated circuits. In some embodiments, the baseband processor 106 and the modulator 108 are separate integrated circuits or chipsets. In one embodiment, the baseband processor 106 and the modulator 108 reside on a common carrier substrate die of an integrated circuit. In other embodiments, the baseband processor 106 and the modulator 108 are disposed on the PCB along with RF front-end circuitry, such as the power amplifier 110, the modulator 108, or the like. The baseband processor 106 is operable to generate RF signals to radiate electromagnetic energy via one or more antennas, such as the antenna 112. In some cases, the baseband processor 106, modulator 108, the power amplifier 110, or any combination thereof can be implemented in an RF module, such as a chipset implementing the Wi-Fi® technology. In one embodiment, the RF circuitry includes a WLAN radio and a PAN radio. In other embodiments, the RF radios may be specific to the frequency bands of interest. A processing device coupled to the baseband processor 106 may be an application processor that implements other operations of the electronic device 100. In another embodiment, an application-specific integrated circuit (ASIC), a field-programmable gate array (FPGA), or other mixed-signal integrated circuits may be used to implement the operations described herein to control amplitudes of select subcarriers of the OFDM system 104 when connected to another device on a wireless channel.

In one embodiment, the baseband processor 106 includes one or more transceivers that can operate at 2.45 GHz and 5 GHz. The baseband processor 106 can implement the Wi-Fi® technology. It should be noted that the Wi-Fi® technology is the industry name for wireless local area network communication technology related to the IEEE 802.11 family of wireless networking standards by Wi-Fi Alliance. For example, a dual-band WLAN RF transceiver allows an electronic device to exchange data or connect to the Internet using radio waves in two WLAN bands (2.4 GHz band, 5 GHz band) via one or multiple antennas. For example, a dual-band WLAN RF transceiver includes a 5 GHz WLAN channel and a 2.4 GHz WLAN channel. The WLAN radio may include additional transceivers that operate in the 2.45 GHz, 5 GHz, or both. A PAN module includes a transceiver that also operates at 2.4 GHz and may implement the Bluetooth® technology or the Zigbee® technology. The WLAN radio and PAN radio can be individual chipsets, even chipsets provided by different vendors. The WLAN radio and the PAN radio may be implemented in the same chipset or on a common carrier substrate with a processing device, such as a System on Chip (SoC) architecture. In another embodiment, other wireless RF radios may be used to implement other technologies, such as the LTE technology, or the like. For example, the RF circuitry may include other radios, such as a wireless area network (WAN) radio, PAN radio, GNSS radio (e.g., global positioning system (GPS) radio), or the like. In other embodiments, the antenna architecture may include additional RF radios and/or other communication modules, such as a WLAN radio, a GPS receiver, a near field communication (NFC) radio, an amplitude modulation (AM) radio receiver, a frequency modulation (FM) radio receiver, a PAN radio (e.g., Bluetooth® radio, Zigbee® radio), a GNSS receiver, or the like. The RF circuitry may also include receivers and/or transmitters, filters, amplifiers, mixers, switches, and/or other electrical components. The RF circuitry may be coupled to a modem that allows the user device to handle both voice and non-voice communications (such as communications for text messages, multi-media messages, media downloads, web browsing, etc.) with a wireless communication system. The modem may provide network connectivity using any type of digital mobile network technology including, for example, LTE, LTE advanced (4G), CDPD, GPRS, EDGE, UMTS, 1×RTT, EVDO, HSDPA, WLAN (e.g., Wi-Fi® network), etc. In the depicted embodiment, the modem can use the RF circuitry to radiate electromagnetic energy on the antennas to communicate data to and from the user device in the respective frequency ranges. In other embodiments, the modem may communicate according to different communication types (e.g., WCDMA, GSM, LTE, CDMA, WiMAX, etc.) in different cellular networks. It should be noted that radiation enables the functionality of both transmission and receiving data using reciprocity.

Figure 3:
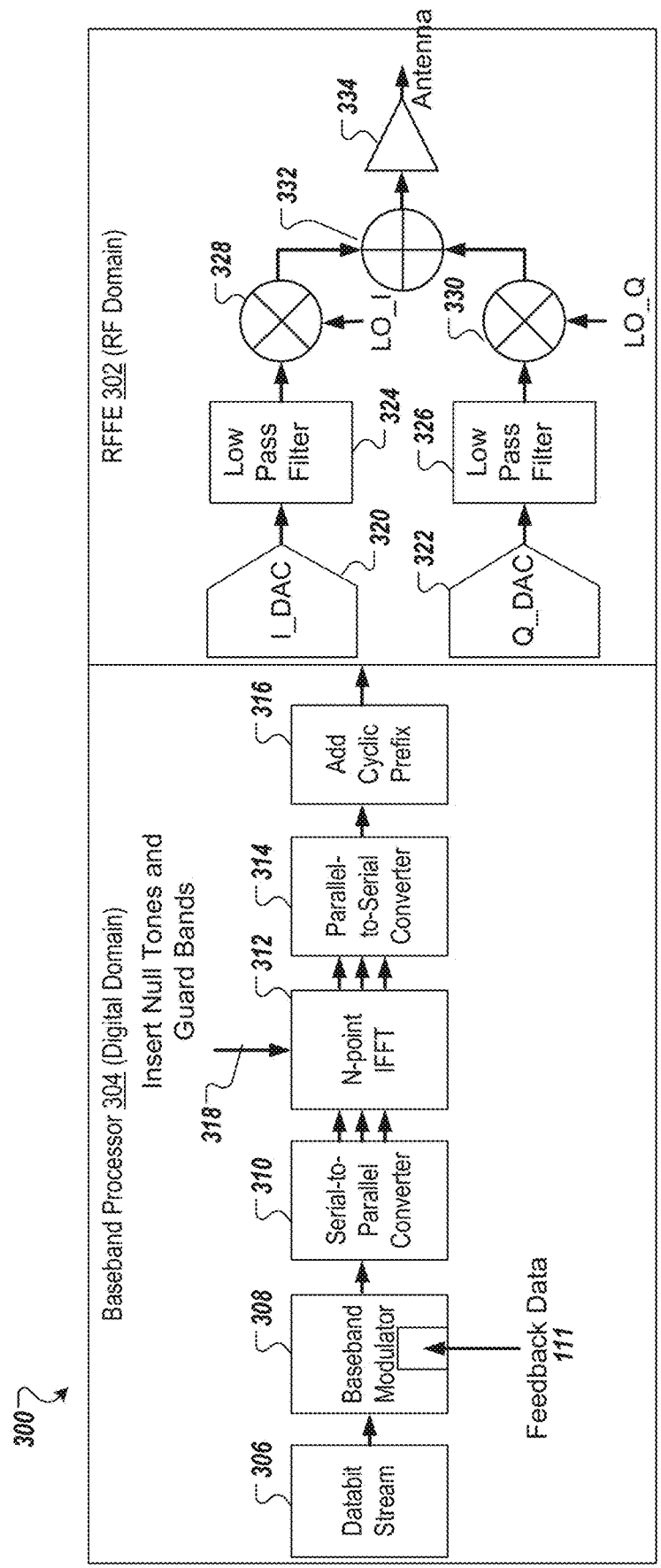
FIG. 3 is a block diagram of a radio having a subcarrier pre-equalization DSP logic in an OFDM block in a digital domain and an analog RF front-end in the RF domain according to one embodiment.

In one embodiment, the OFDM system 104 is implemented as hardware, software, firmware, or any combination thereof in a digital domain, an analog domain, or both. In other embodiments, the OFDM system 104 includes an OFDM block in a digital domain and an analog front-end in the RF domain, as illustrated in FIG. 3.

Figure 2:
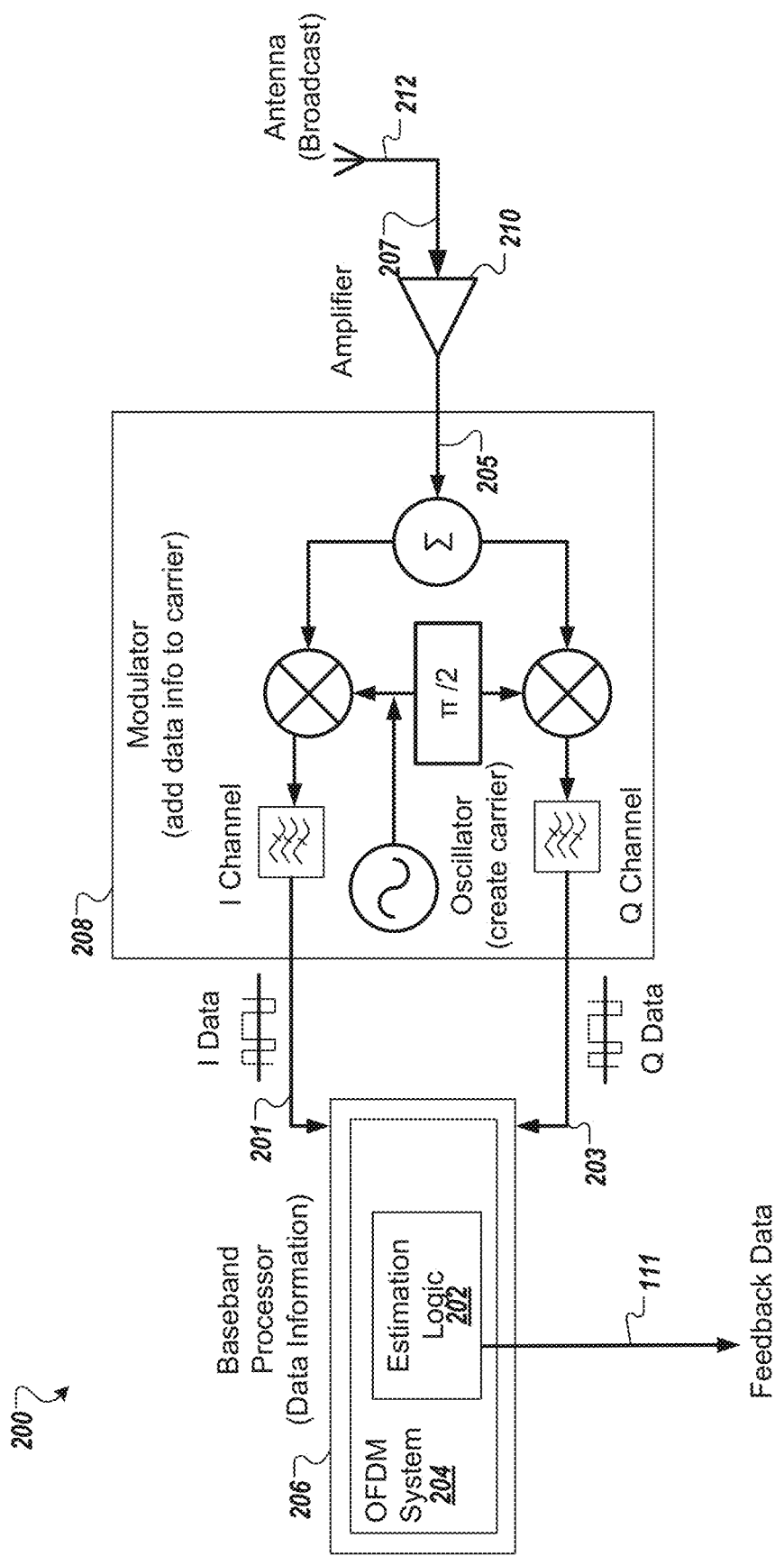
FIG. 2 is a block diagram of an electronic device with estimation logic in a receiver to improve a frequency selective fading characteristic of a wireless channel according to one embodiment.

FIG. 2 is a block diagram of an electronic device 200 with estimation logic in a receiver to improve a frequency selective fading characteristic of a wireless channel according to one embodiment.

The electronic device 200 includes a baseband processor 206, including the estimation logic 202 and the OFDM system 204. The electronic device 200 also includes a modulator 208, an amplifier 210, and an antenna 212. In general, the amplifier 210 receives an RF signal 207 via the antenna 212 and outputs an amplified signal 205 to the modulator 208. The modulator 208 receives the amplified signal 205 and modulates the amplified signal with a carrier signal to obtain input data in the form of I data 201 and Q data 203. The I data 201 and Q data 203 are input to the baseband processor 206 for further processing by the OFDM system 204 and the estimation logic 202.

The baseband processor 206 includes the estimation logic 202. The estimation logic 202 measures a fast Fourier transform (FFT) response of the I data 201 and Q data 203 across the set of data subcarriers. The estimation logic 202 can measure the FFT response at each receiver of the electronic device 200. For example, the estimation logic 202 measures a first FFT response of the RF signals across the set of data subcarriers at a first receiver and a second FFT response of the RF signals across the set of data subcarriers at a second receiver. The estimation logic 202 determines from the FFT response(s) that a subset of the set of data subcarriers have power levels that are lower than a threshold value. The threshold value represents a frequency selective fading characteristic of the wireless channel between the electronic device 200 and the other device (e.g., electronic device 100). The estimation logic 202 generates a value or a gain code coefficient for each of the data subcarriers. The value or gain code coefficient causes an amplitude value for the corresponding data subcarrier to be adjusted (e.g., increased from a first amplitude value to a second amplitude value). The estimation logic 202 can generate a value based on the respective data subcarrier having a power level that is lower than the threshold value. For example, when a first data subcarrier needs to be adjusted and a second data subcarrier is maintained, the estimation logic 202 can generate a first value for the first data subcarrier and a second value for the second data subcarrier. The first value can cause the transmitter to adjust the first data subcarrier to operate at a second amplitude value greater than a first amplitude value, such as a default amplitude value. The second value can cause the transmitter to maintain the second data subcarrier to operate at the first amplitude value. Once generated, the values or gain code coefficients can be sent in the feedback data 111 as described above with respect to FIG. 1.

FIG. 3 is a block diagram of a radio 300 having a subcarrier pre-equalization DSP logic 302 in an OFDM block 304 in a digital domain and an analog RF front-end 302 in the RF domain according to one embodiment. The concepts used in a simple analog OFDM implementation can be extended to the digital domain by using a combination of Fast Fourier Transform (FFT) and Inverse Fast Fourier Transform (IFFT) digital signal processing. These transforms may digitally-modulated input data (data symbols) onto orthogonal subcarriers. In principle, the IFFT takes frequency-domain input data (complex numbers representing the modulated subcarriers) and converts it to the time-domain output data (analog OFDM symbol waveform). In a digitally implemented OFDM system, referred to as the OFDM block 304 of the baseband processor, the input bits in a databit stream 306 are input into a baseband modulator 308. The input bits are grouped and mapped to source data symbols that are a complex number representing the modulation constellation point (e.g., the BPSK or QAM symbols that would be present in a single subcarrier system). The baseband modulator 308 provides the output to a serial-to-parallel converter 310 to provide inputs to an N-point IFFT 312. These complex source symbols are treated by the transmitter as though they are in the frequency domain and are the inputs to the N-point IFFT 312 that transforms the data into the time domain. The N-point IFFT 312 takes in N source symbols at a time, where N represents the number of subcarriers in the system. Each of these N input symbols has a symbol period of T seconds. The output of the N-point IFFT 312 is N orthogonal sinusoids. These orthogonal sinusoids each have a different frequency, and the lowest frequency is a direct current (DC).

The input symbols are complex values representing the mapped constellation point and therefore specify both the amplitude and phase of the sinusoid for that subcarrier. The output of the N-point IFFT 312 is the summation of all N sinusoids. Thus, the N-point IFFT 312 provides a simple way to modulate data onto N orthogonal subcarriers. The block of N output samples from the N-point IFFT 312 make up a single OFDM symbol. The output of the N-point IFFT 312 can be received by a parallel-to-serial converter 314 to convert the output into serial form.

After some additional processing, such as adding a cyclic prefix 316 to the output of the parallel-to-serial converter 314, the time-domain signal that results from the N-point IFFT 312 is transmitted across a radio channel (RFFE 302). Although not illustrated in FIG. 3, at a receiver, an FFT block is used to process the received signal and bring it into the frequency domain, which is used to recover the original data bits.

For example, an 802.11a OFDM carrier signal (burst type) is the sum of one or more OFDM symbols, each comprised of 52 orthogonal subcarriers, with baseband data on each subcarrier being independently modulated using quadrature amplitude modulation (available formats: BPSK, QPSK, 16-QAM, or 64-QAM). This composite baseband signal is used to modulate a main RF carrier. To begin the OFDM signal creation process, the input data bitstream is encoded with convolutional coding and Interleaving. Each data stream is divided into groups of "n" bits (1 bit-BPSK, 2 bits-QPSK, 4 bits-16QAM, or 6 bits-64QAM) and converted into complex numbers (I+jQ) representing the mapped constellation point. Note that the bit-rate will be different depending on the modulation format, a 64-QAM constellation (6 bits at a time) can have a bit rate of 54 Mbps, while a QPSK constellation (2 bits at a time) may only be 12 Mbps. Then 52 bins of the N-point IFFT 312 are loaded. The 48 bins contain the constellation points mapped into frequency offset indexes ranging from −26 to +26, skipping 4 Pilot bins corresponding to four pilot subcarriers, and zero bin corresponding to a DC subcarrier. There can be four pilot subcarriers inserted into frequency offset index locations −21, −7, +7, and +21. The zero bin is the Null or DC subcarrier and is not used; it contains a 0 value (0+j0). In some embodiments, additional subcarriers can be nulled in addition to the DC subcarrier. To do so, null tones and guard bands are inserted as inputs 318 into the N-point IFFT 312.

When the N-point IFFT 312 is completely loaded, the Inverse FFT is computed, giving a set of complex time-domain samples representing the combined OFDM subcarrier waveform. For example, the samples can be clocked out at 20 Msps to create a 3.2 μs (20 Msps/64) duration OFDM waveform. To complete the OFDM symbol, a 0.8 μs duration Guard Interval (GI) is then added to the beginning of the OFDM waveform. This produces a single OFDM symbol with a time duration of 4 μs in length (3.2 μs+0.8 μs). The process is repeated to create additional OFDM symbols for the remaining input data bits. To complete the OFDM frame structure, the single OFDM symbols are concatenated together and then appended to a 16 microsecond (μs) Preamble (used for synchronization) and a 4 μs SIGNAL symbol (provides Rate and Length information). This completes the OFDM frame and is ready to be transmitted as an OFDM Burst by the analog RF front-end 302 in the RF domain. The OFDM block 304 of the baseband processor outputs the OFDM symbol waveforms as I data and Q data in the illustrated embodiment.

The analog RF front-end 302 in the RF domain can include two digital-to-analog converters (DACs) 320, 322, corresponding low pass filters 324, 326, mixers 328, 330, and an adder 332 coupled to a power amplifier 334. The power amplifier 334 is to be coupled to an antenna (not illustrated in FIG. 3). The DAC 320, low pass filter 324, and mixer 328 correspond to the I data, and the DAC 322, low pass filter 326, and mixer 330 correspond to the Q data. The power amplifier 334 applies one or more RF signals to the antenna to communicate the data (i.e., information) to another device, such as an access point.

In one embodiment, the baseband processor (not illustrated in FIG. 3) uses a digital multi-carrier modulation scheme that defines a set of data subcarriers, a set of pilot subcarriers, and a DC subcarrier to communicate data in the same single channel. The baseband processor establishes a wireless communication link with a second device, such as an access point, using a 2.4 GHz frequency band or a 5 GHz frequency band. A modulator can be coupled to the baseband processor. The modulator can include the components illustrated and described with respect to the RFFE 302 in the analog domain in FIG. 3. Alternatively, the modulator can include other components to modulate the OFDM symbols In one embodiment, the baseband modulator 308 receives feedback data 111. The feedback data 111 can include information that amplitude values for one or more of the data subcarriers. The baseband modulator 308 uses this information to adjust the data subcarriers' amplitude values before the N-point IFFT 312. For example, the input bits can be grouped and mapped to source data symbols that are complex numbers representing modulation constellation points. As noted above, these complex numbers can specify both the amplitude and phase of the sinusoid for that particular subcarrier. The baseband modulator 308 can use the feedback data 111 to modify the amplitude of any one or more of the data subcarriers.

In one embodiment, the amplitude values can be specified in an OFDM parameter structure that includes parameters that control operations of the OFDM block 304 of the baseband processor. The OFDM parameter structure can specify the set of subcarriers and a subset of data subcarriers to be nulled. The baseband processor can process the feedback data 111 and modify the OFDM parameter structure to adjust the respective data subcarriers' amplitude values.

In at least one embodiment, a first device includes a baseband processing with an OFDM system and subcarrier pre-equalization DSP logic. The first device also includes a modulator coupled to the baseband processor and a power amplifier coupled to the modulator. The power amplifier applies a radio frequency (RF) signal to an antenna to communicate the data to the second device. The OFDM system uses a digital multi-carrier modulation scheme that defines a set of data subcarriers, a set of pilot subcarriers, and a direct current (DC) subcarrier to communicate data in a wireless channel between the first device and a second device. The subcarrier pre-equalization DSP logic receives feedback data from the second device, indicating a frequency selective fading characteristic of the wireless channel. The subcarrier pre-equalization DSP logic adjusts a first amplitude value of a subset of the set of data subcarriers to a second amplitude value. Adjusting the first amplitude value to the second amplitude value reduces the frequency selective fading characteristic of the wireless channel.

In one embodiment, a single antenna is coupled to the power amplifier. In another embodiment, a second OFDM system of a second transmitter can be used with a second subcarrier pre-equalization DSP logic. A second modulator is coupled to the second OFDM system, and a second power amplifier is coupled to the second modulator. A first antenna is coupled to the power amplifier, and a second antenna is coupled to the second power amplifier. The baseband processor can operate in a MIMO mode and send data via the first antenna and the second antenna.

In at least one embodiment, the OFDM system performs bit-level processing on input bits to generate modulation symbols (e.g., QAM or PSK symbols) and performs symbol-level processing on the modulation symbols to generate the data. The data is discrete time-domain data, and the OFDM system performs the symbol-level processing by performing an IFFT of the modulation symbols. The first amplitude value is adjusted to the second amplitude value before the IFFT of the modulation symbols.

In at least one embodiment, the first device also includes a first receiver coupled to the antenna and a second receiver coupled to a second antenna. The first receiver and the second receiver to receive RF signals from a third device. The first device includes estimation logic coupled to the first receiver and the second receiver. The estimation logic measures a first FFT response of the RF signals across a second set of data subcarriers at the first receiver and a second FFT response of the RF signals across the second set of data subcarriers at the second receiver. The estimation logic determines, from the first FFT response and the second FFT response, that a second subset of the second set of data subcarriers has lower power levels than a threshold value. The threshold value represents a frequency selective fading characteristic of a second wireless channel between the first and third devices. The estimation logic generates a gain code coefficient for the second subset of the second set of data subcarriers and sends the gain code coefficient to the third device. The gain code coefficient causes the third device to adjust a third amplitude value of the second subset of the second set of data subcarriers to a fourth amplitude value. Adjusting the third amplitude value to the fourth amplitude value reduces the frequency selective fading characteristic of the second wireless channel.

In another embodiment, the OFDM system maps input bits into a modulation symbol comprising the set of data subcarriers and converts the modulation symbol into discrete time-domain data using an IFFT. The first amplitude value is adjusted to the second amplitude value for the subset of data subcarriers before the IFFT. The OFDM system converts the discrete time-domain data into analog data. The modulator modulates the analog data onto RF signals, and the power amplifier is to amplify and send the RF signals via the antenna.

Figure 4A:
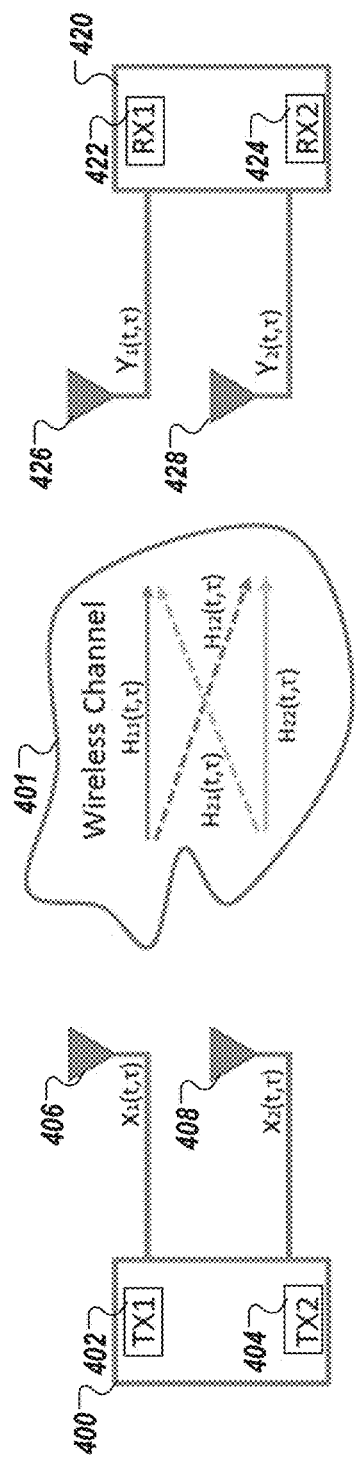
FIG. 4A illustrates a wireless channel between a first device with multiple antennas and a second device with multiple antennas according to one embodiment.
Figure 4B:
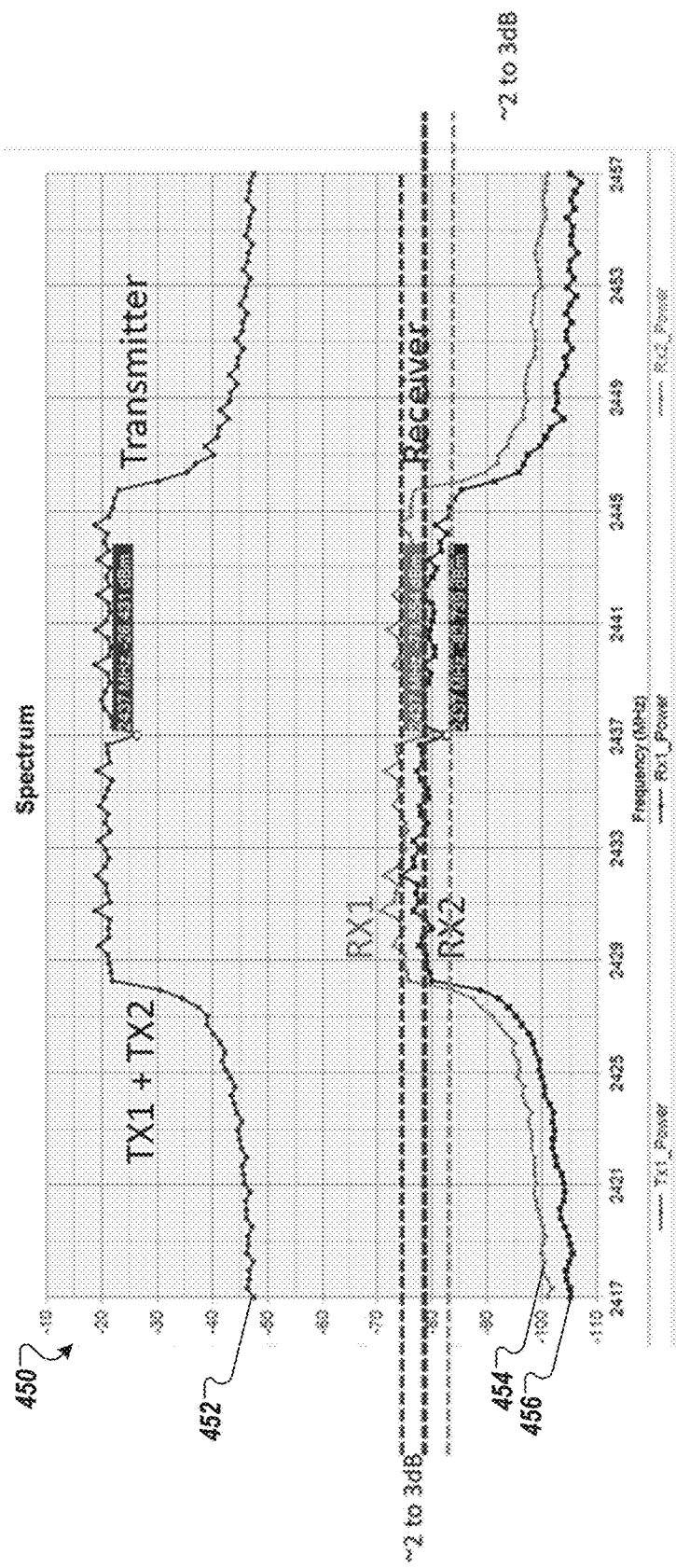
FIG. 4B is a graph illustrating a transmit signal power level of two transmitters of a first device and received signal power levels of the two receivers of a second device according to one embodiment.

FIG. 4A illustrates a wireless channel 401 between a first device 400 with multiple antennas and a second device 420 with multiple antennas according to one embodiment. The first device 400 includes two transmitters—a first transmitter 402 and a second transmitter 404. The first transmitter 402 is coupled to a first antenna 406, and the second transmitter 404 is coupled to a second antenna 408. The first transmitter 402 and the second transmitter 404 can operate in a MIMO mode. In the MIMO mode, the first transmitter 402 and the second transmitter 404 send first data over the wireless channel 401, such as illustrated in FIG. 4B. The second device 420 includes two receivers—a first receiver 422 and a second receiver 424. The first receiver 422 is coupled to a first antenna 426 and the second receiver 424 is coupled to a second antenna 428. The first receiver 422 and the second receiver 424 can operate in the MIMO mode. In the MIMO mode, the first receiver 442 receives an RF signal having a first received signal power level 454 over the wireless channel 401, such as illustrated in FIG. 4B. In the MIMO mode, the second receiver 424 receives an RF signal having a second received signal power level 456 over the wireless channel 401, such as illustrated in FIG. 4B.

FIG. 4B is a graph 450 illustrating a transmit signal power level 452 of the two transmitters 402, 404 of the first device 400 and received signal power levels 454, 456 of the two receivers 422, 424 of the second device 420 according to one embodiment. As described herein, the estimation logic can measure the received signal power levels 454, 456, and determine whether the received signal power levels 454, 456 exceed a threshold condition. For example, the threshold condition can be that a difference in the received signal power levels 454, 456 do not exceed a threshold range of approximately 2 to 3 dB. The estimation logic can detect a frequency selective fading characteristic in the wireless channel 401, illustrated and described in more detail with respect to FIGS. 6A-6B. The estimation logic can send feedback data based on the received signal power levels 454, 456 across the data subcarriers. The feedback data can include a first value indicative of the received signal power level 454 (or 456) for a first data subcarrier. Alternatively, the feedback data can include a first value indicative of a difference of the received signal power level 454 and the received signal power level 456 for the first data subcarrier. The feedback data can include a second value indicative of the received signal power level 454 (or 456) for a second data subcarrier. Alternatively, the feedback data can include a second value indicative of a difference of the received signal power level 454 and the received signal power level 456 for the second data subcarrier.

Figure 5:
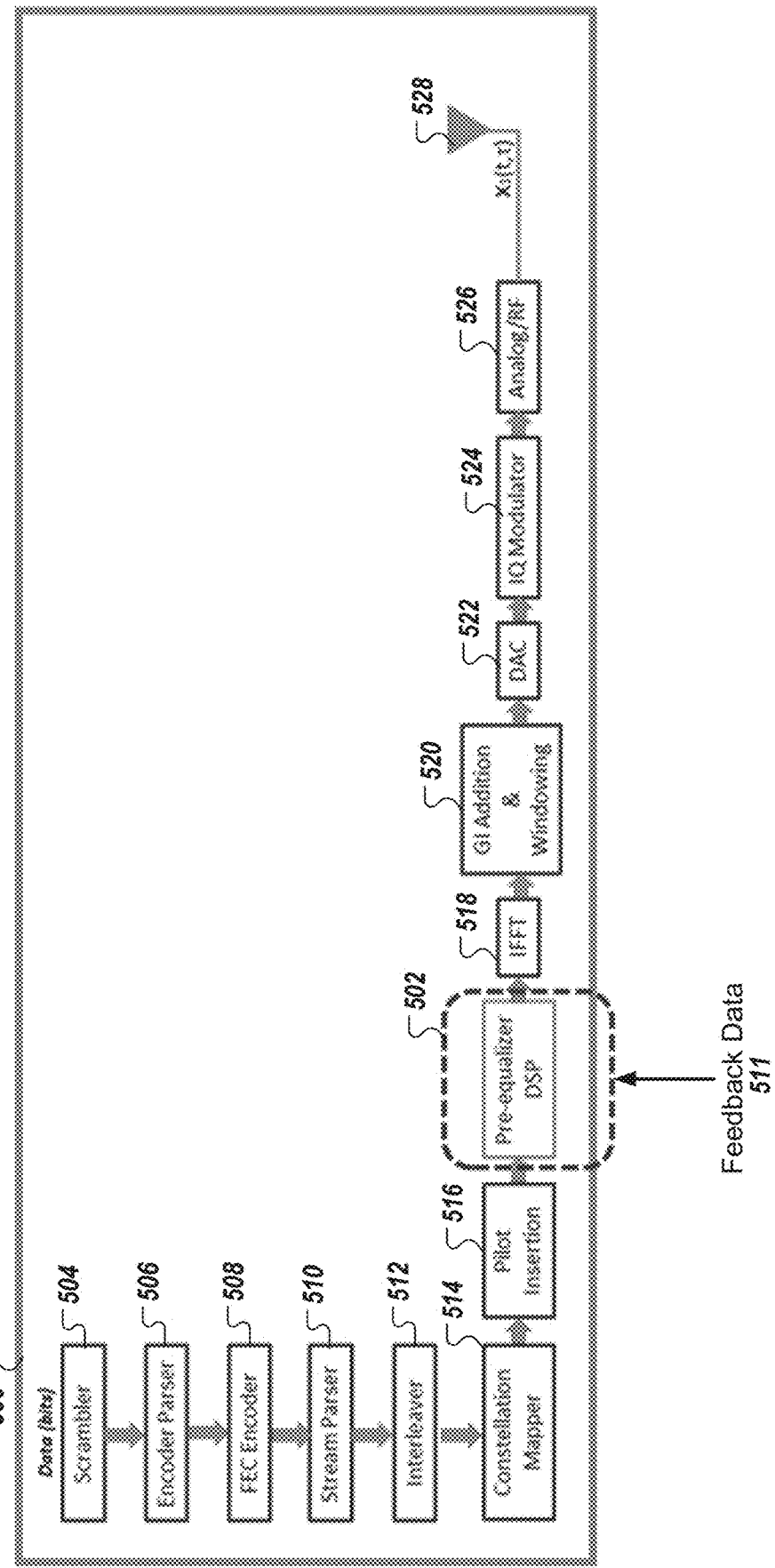
FIG. 5 is a block diagram of a transmitter with a subcarrier pre-equalization logic DSP block according to one embodiment.

FIG. 5 is a block diagram of a transmitter 500 with a subcarrier pre-equalization DSP block 502 according to one embodiment. The subcarrier pre-equalization DSP block 502 is similar to or includes the subcarrier pre-equalization logic 102 of FIG. 1. The transmitter 500 includes multiple DSP blocks, including a scrambler 504, an encoder parser 506, forward error correction (FEC) encoder 508, stream parser 510, interleaver 512, constellation mapper 514, pilot insertion block 516, subcarrier pre-equalization DSP block 502, IFFT block 518, and guard interval (GI) and windowing block 520. The transmitter 500 includes a digital-to-analog converter (DAC) 522 to convert digital data to analog data. The transmitter 500 includes an IQ modulator 524 and analog radio frequency circuitry 526. The analog radio frequency circuitry 526 is coupled to an antenna 528.

During operation, the scrambler 504 receives data, such as an input data block of multiple bits, from an application or memory to be sent by the transmitter 500. The scrambler 504 scrambles the data to randomize the data and passes the scrambled data to the encoder parser 506. The encoder parser 506 parses the data to prepare the data for encoding. The FEC encoder 508 encodes the data and passes the data to the stream parser 510. The stream parser 510 parses the data into streams and passes the data to the interleaver 512. The interleaver 512 interleaves the data before it is mapped to constellation points by the constellation mapper 514. The pilot insertion block 516 inserts the pilot subcarriers. As described herein, the subcarrier pre-equalization DSP block 502 adjusts zero or more amplitudes of the data subcarriers based on feedback data 111 before the IFFT is performed by the IFFT block 518. After IFFT, the GI addition and windowing block 520 can add the guard interval and shape the signal before the DAC 522 converts the digital signals to analog signals. The IQ modulator 524 modulates the analog signals, and the analog RF circuitry 526 sends the RF signals via the antenna 528.

Figure 6A:
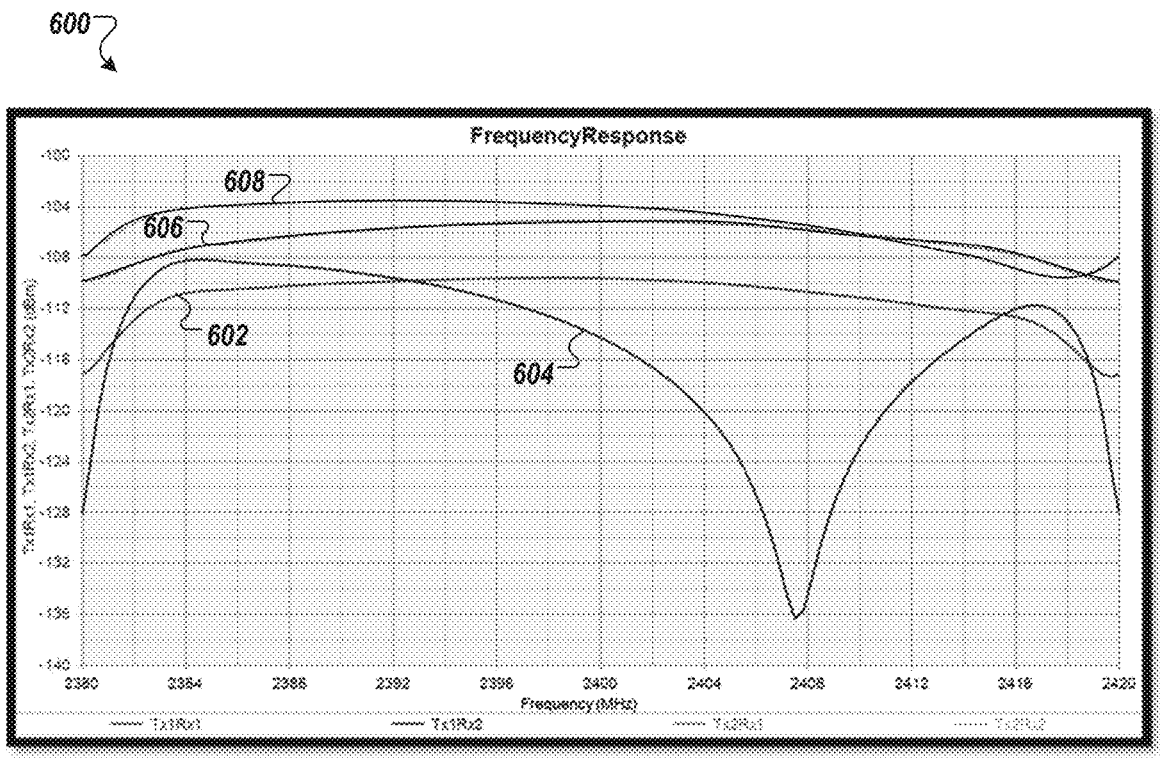
FIG. 6A is a graph illustrating frequency responses of propagation sub-channels of a 2×2 multiple-input-multiple-output (MIMO) wireless, illustrating a frequency selective fading characteristic on one of the sub-channels before equalization according to one embodiment.
Figure 6B:
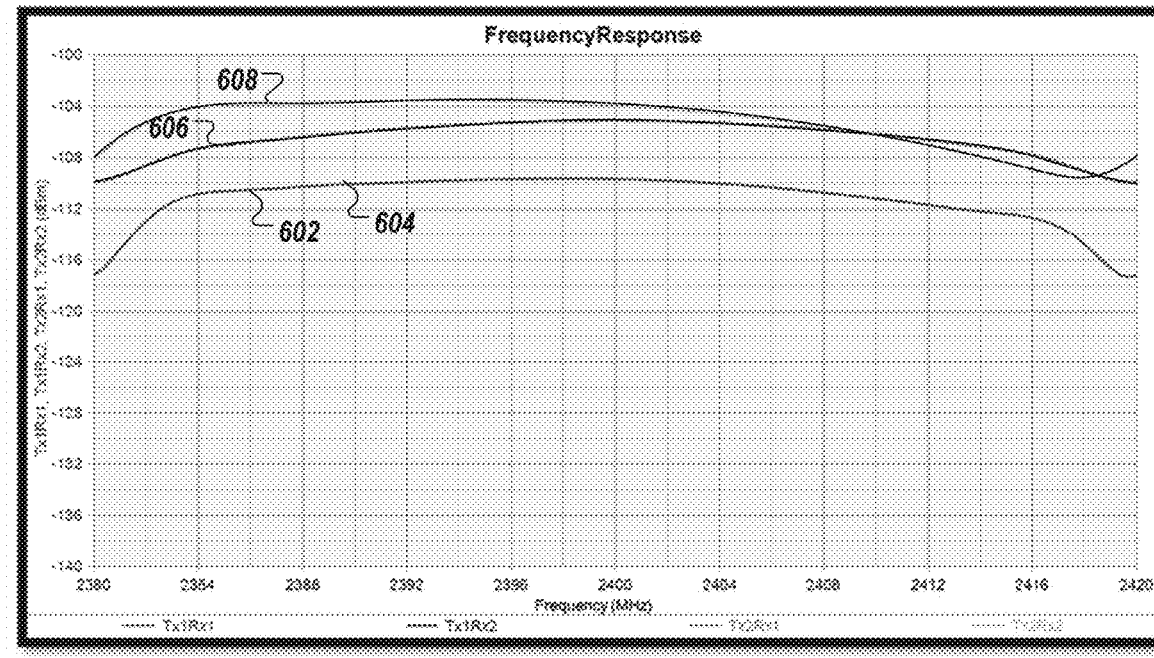
FIG. 6B is a graph illustrating frequency responses of propagation sub-channels of a 2×2 MIMO wireless, illustrating a reduction in the frequency selective fading characteristic on one of the sub-channels after equalization according to one embodiment.

In at least one embodiment, the subcarrier pre-equalizer DSP block 502 can adjust amplitudes to improve a frequency selective fading characteristic on one or more subcarriers of the wireless channel, such as illustrated in FIGS. 6A-6B.

FIG. 6A is a graph 600 illustrating frequency responses of propagation sub-channels of a 2×2 MIMO wireless, illustrating a frequency selective fading characteristic on one of the sub-channels before equalization according to one embodiment. A wireless channel can be represented as multiple sub-channel frequency responses, including i) a first frequency response 602 representing a path between a first transmitter and a first receiver (Tx1Rx1); ii) a second frequency response a 604 representing a path between a first transmitter and a second receiver (Tx1Rx2); iii) a third frequency response 606 representing a path between a second transmitter and a first receiver (Tx2Rx1); and iv) a fourth frequency response 608 representing a path between a second transmitter and a second receiver (Tx2Rx2). As illustrated in the first and second frequency responses 602, 604, the wireless channel has a frequency selective fading characteristic on one of the sub-channels before equalization. That is, due to multipath fading, certain data subcarriers have lower power. Using the embodiments described herein, the data subcarriers with lower power can be identified. The amplitude of those data subcarriers can be increased before IFFT at the transmitter. Increasing the amplitude of those data subcarriers at the transmitter results in removing the frequency selective fading characteristic in FIG. 6A, as illustrated in the frequency responses of FIG. 6B.

FIG. 6B is a graph 650 illustrating frequency responses of propagation sub-channels of a 2×2 MIMO wireless, illustrating a reduction in the frequency selective fading characteristic on one of the sub-channels after equalization according to one embodiment. After equalizing the data subcarriers with lower power, the sub-channel frequency response 604 is corrected to correspond to the frequency response 602, thereby improving or removing the frequency selective fading characteristic of the wireless channel.

Figure 7A:
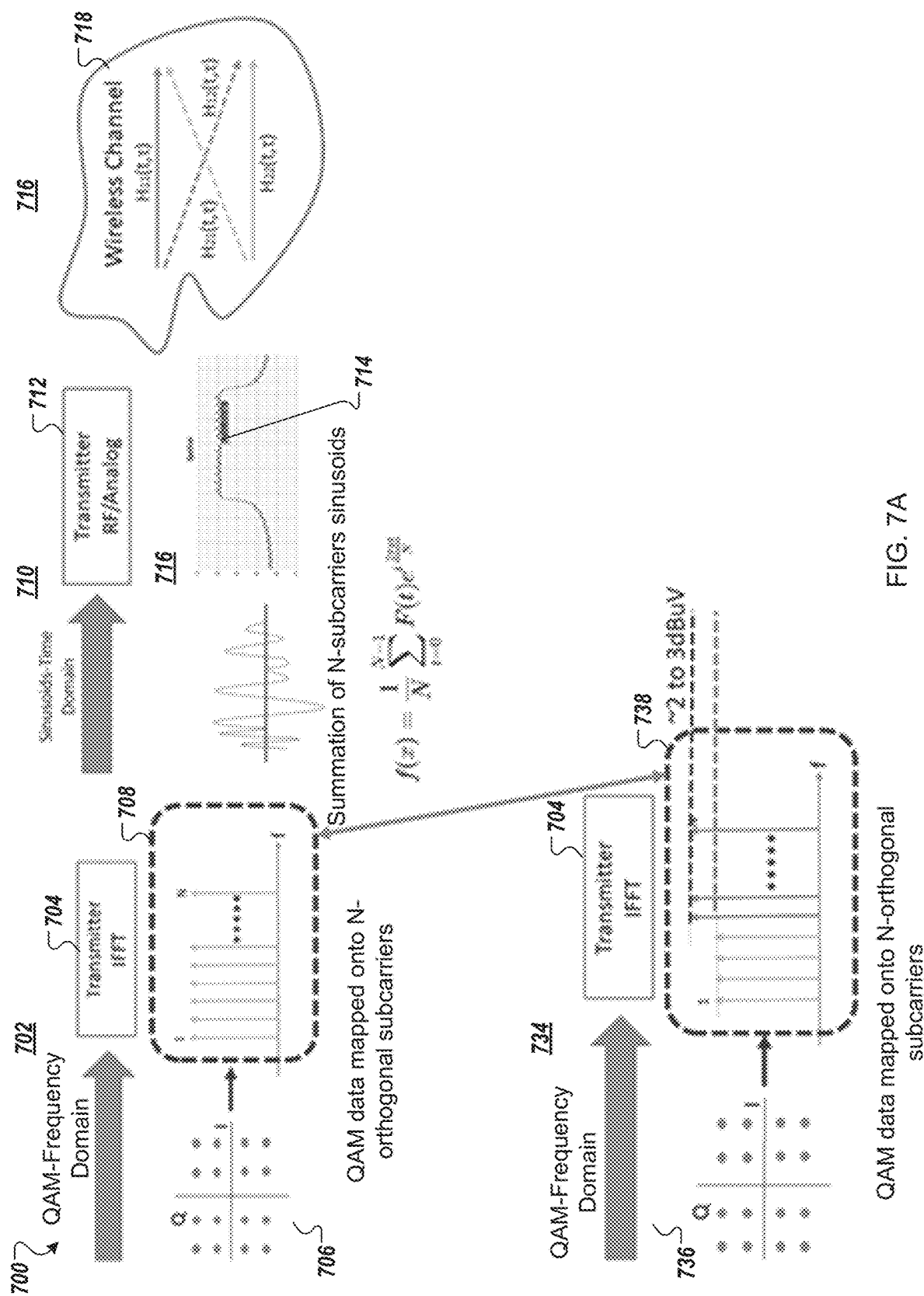
FIGS. 7A-7B illustrate a functional flow of operations for subcarrier pre-equalization of a subset of data subcarriers according to one embodiment.
Figure 7B:
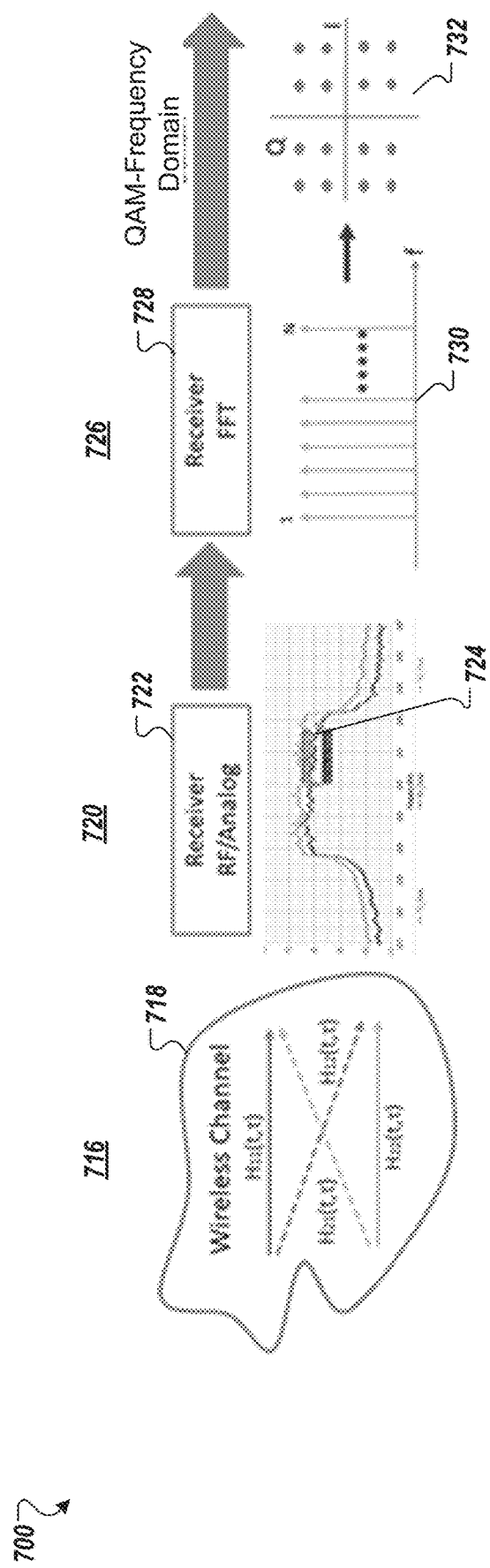

FIGS. 7A-7B illustrate a functional flow 700 of operations for subcarrier pre-equalization of a subset of data subcarriers according to one embodiment. The functional flow 700 starts at a first stage 702 with a transmitter IFFT 704 mapping QAM data 706 onto N orthogonal subcarriers 708. The N orthogonal subcarriers 708 can each have a first amplitude value, such as a default amplitude value. At a second stage 710, a transmitter RF analog circuitry 712 generates the N subcarrier sinusoidal signals and an RF signal 714 that is a summation of the N subcarrier sinusoidal signals. At a third stage 716, the transmitter RF analog circuitry 712 sends the RF signal 714 over a wireless channel 718. The wireless channel 718 can be a multipath channel in a MIMO mode, such as when the RF signal 714 is transmitted using two or more transmit antennas or using a single transmit antenna and received by two or more receive antennas. Alternatively, the wireless channel 718 can be a single-path channel in a SISO mode. As illustrated in FIG. 7B, at a fourth stage 720, receiver RF analog circuitry 722 receives RF signal(s) 724). At a fifth stage 726, a receiver FFT 728 generates N orthogonal subcarriers 730 from the RF signal(s) 724) and maps the N orthogonal subcarriers 730 into QAM data 732. The QAM data 732 can be used to determine received signal power levels for each of the N orthogonal subcarriers 730. The QAM data 732 can be used to determine a frequency selecting fading characteristic in the wireless channel 718, such as illustrated in the frequency response of FIG. 6A. The receiver can send feedback data including the QAM data 732, frequency response data, and/or gain code coefficients to adjust amplitudes a subset of the N orthogonal subcarriers to compensate for the selective fading characteristic in the wireless channel 718. Referring back to FIG. 7A, using the feedback data at a sixth stage 734, the transmitter IFFT 704 can map QAM data 736 onto N orthogonal subcarriers 738 and adjust the subset of the N orthogonal subcarriers 738 from the first amplitude value to a second amplitude value, such as a higher value as illustrated in FIG. 7. In at least one embodiment, the feedback data includes a first value indicative of a first received signal power level corresponding to the first data subcarrier and a second value indicative of a second received signal power level corresponding to the second data. The transmitter can adjust the first data subcarrier to operate at a second amplitude value using the first value. The second amplitude value can be greater than the first amplitude value. The transmitter can maintain the second data subcarrier to operate at the first amplitude value using the second value. In at least one embodiment, the subset of the N orthogonal subcarriers 738 is adjusted to the same amplitude value. In another embodiment, each subcarrier of the subset of the N orthogonal subcarriers 738 can be individually adjusted to unique amplitude values. In at least one embodiment, a difference value between the first amplitude value and the second amplitude value can be between approximately 2 and 3 dBuV. Alternatively, other difference values can be used for the adjusted amplitude values.

As described above, the frequency selective fading characteristic can impair one or more of the MIMO sub-channels. When operating with an impaired MIMO sub-channel, an end-to-end RF link operates at a lower PHY rate, resulting in lower throughput. Using the subcarrier pre-equalization technique described herein, the MIMO sub-channel can be improved, and the end-to-end RF link can operate at higher PHY rates, resulting in higher throughput, as illustrated in FIG. 8.

Figure 8:
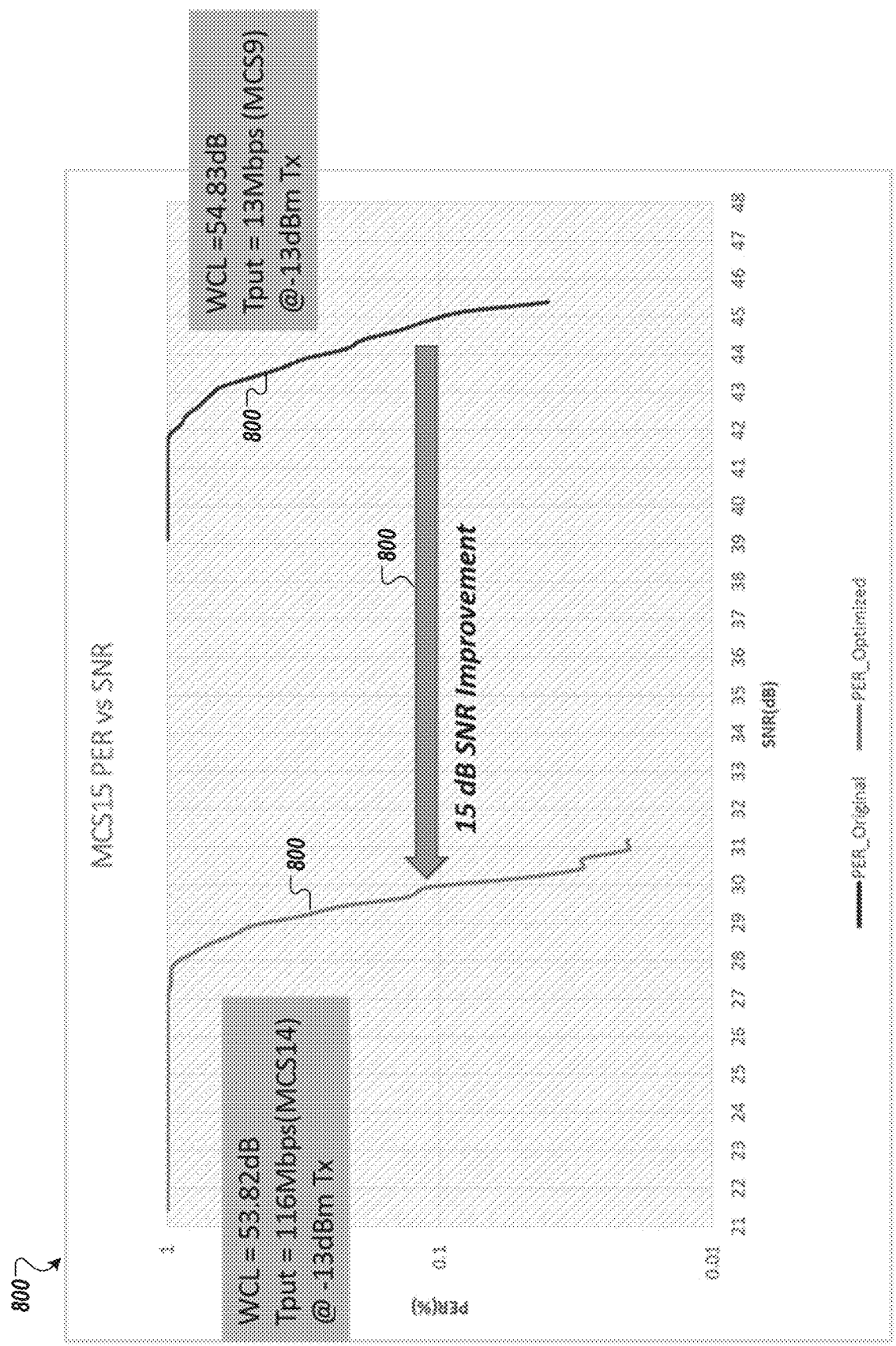
FIG. 8 is a graph illustrating an improvement in signal-to-noise ratio (SNR) in a wireless channel according to one embodiment.

FIG. 8 is a graph 800 illustrating an improvement in signal-to-noise ratio (SNR) in a wireless channel according to one embodiment. Graph 800 illustrates a packet error rate (PER) 802 in transmitted data over a wireless channel between a transmitter and a receiver without the subcarrier pre-equalization technique. Graph 800 illustrates a PER 804 in transmitted data over a wireless channel between a transmitter and a receiver with the subcarrier pre-equalization technique described herein. For PER 802, the wireless channel loss (WCL) is 54.83 dB, and the frequency selective fading characteristic in the wireless channel causes the RF link to operate at a PHY rate of MCS9, resulting in a throughput of 13 Mbps. For PER 802, the WCL can be 53.82 dB, and the subcarrier pre-equalization technique results in an SNR improvement 806 of approximately 15 dB, causing the RF link to operate at a PHY rate of MCS15, resulting in a throughput of 116 Mbps.

Figure 9:
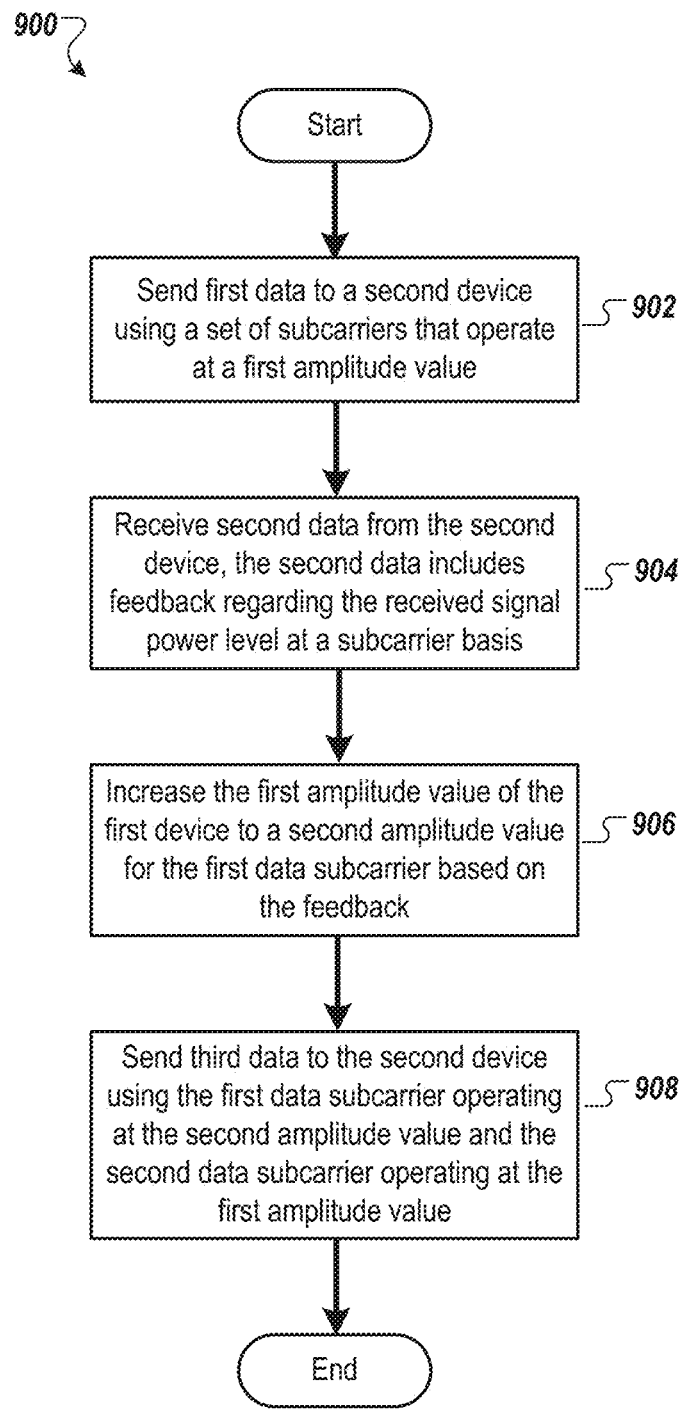
FIG. 9 is a flow diagram of a method for adjusting amplitudes of a subset of data subcarriers according to one embodiment.

FIG. 9 is a flow diagram of a method 900 for adjusting amplitudes of a subset of data subcarriers according to one embodiment. The method 900 may be implemented using processing logic comprising hardware, software, firmware, or any combination thereof. In one embodiment, the subcarrier pre-equalization logic 102 of FIG. 1 implements the method 900. Alternatively, the transmitter or first device as described herein implements the method 900.

Referring to FIG. 9, the processing logic of a first device begins by sending first data to a second device using a set of data subcarriers that operate at a first amplitude value (block 902). For example, a first data subcarrier and a second data subcarrier of the set of data subcarriers operate at a first amplitude value. At block 904, the processing logic receives from a second device second data, including feedback from the second device regarding the received signal power level at a subcarrier basis. In at least one embodiment, the second data includes a first value indicative of a first received signal power level corresponding to the first data subcarrier and a second value indicative of a second received signal power level corresponding to the second data subcarrier. The processing logic determines a second amplitude value based on the first value (block 906). In at least one embodiment, the processing logic maintains the first amplitude value for the second data subcarrier based on the second value. The processing logic sends third data to the second device using the first data subcarrier operating at the second amplitude value and the second data subcarrier operating at the first amplitude value (block 908), and the method 900 ends.

In at least one embodiment, the processing logic generates, using input bits of the first data, modulation symbols (e.g., QAM symbols or PSK symbols). The processing logic generates, using the QAM symbols, the third data. The third data can be discrete time-domain data. The processing logic generates, using the QAM symbols, the third data. To generate the third data, the processing logic can perform an IFFT of the modulation symbol. In at least one embodiment, the first amplitude value is adjusted (e.g., increased) to the second amplitude value before the IFFT of the modulation symbols corresponding to the third data. In at least one embodiment, the processing logic determines the second amplitude value before the IFFT.

In at least one embodiment, the processing logic maps input bits into a modulation symbol, including the set of data subcarriers. For example, the processing logic maps input bits into in-phase (Q) and quadrature phase (Q) components of QAM symbols. The QAM symbols can be ordered in a sequence according to a number of the set of subcarriers in the OFDM symbols. In another embodiment, the processing logic generates a modulation symbol using the input bits of the first data. In one embodiment, the processing logic converts the modulation symbol into discrete time-domain data. In at least one embodiment, the processing logic maps inputs bits into a modulation symbol and converts the modulation symbol into discrete time-domain data using an IFFT. In at least one embodiment, the amplitudes of the subset of data subcarriers are increased or otherwise adjusted before converting the modulation symbol (e.g., before the IFFT). The processing logic converts the discrete time-domain data into analog data. The processing logic modulates the analog data onto RF signals and sends the RF signals via one or more antennas.

In at least one embodiment, an OFDM transmitter (802.11n/ac/ax OFDM transmitter), the modulated symbols are mapped to individual subcarriers and sent to an IFFT block. The outputs of the IFFT are time-domain samples. In each OFDM symbol, a certain number of subcarriers are dedicated to pilot signals in order to make the coherent detection robust against frequency offsets and phase noise. Such OFDM symbols are transmitted through the wireless channel and are subjected to small-scale fading due to constructive and destructive interference of multiple signal paths between the transmitter and receiver. This occurs at a spatial scale and is frequency-dependent. Small scale multipath fading impacts the design of indoor wireless communication systems. Based on time delay spread, small-scale fading can be either flat fading or frequency selective fading leading to time dispersion, causing inter-symbol interference (ISI), leading to poor throughputs. On the receiver side, FFT is applied to the OFDM symbols for demodulation.

In at least one embodiment, the feedback data's values can be gain code coefficients generated by the second device. In other embodiments, the second device sends the power level information, and the first device determines the gain code coefficients for adjusting the amplitudes of the subset of data subcarriers. For example, the first value in the second data is a first gain code coefficient, and the second value is a second gain code coefficient. The first gain code coefficient causes the first data subcarrier to be adjusted from the first amplitude value to the second amplitude value.

In at least one embodiment, the processing logic sends the first data and the third data using a first transmitter in a SISO mode. In at least one embodiment, the processing logic sends the first data and the third data using multiple transmitters in a MIMO mode.

Figure 10:
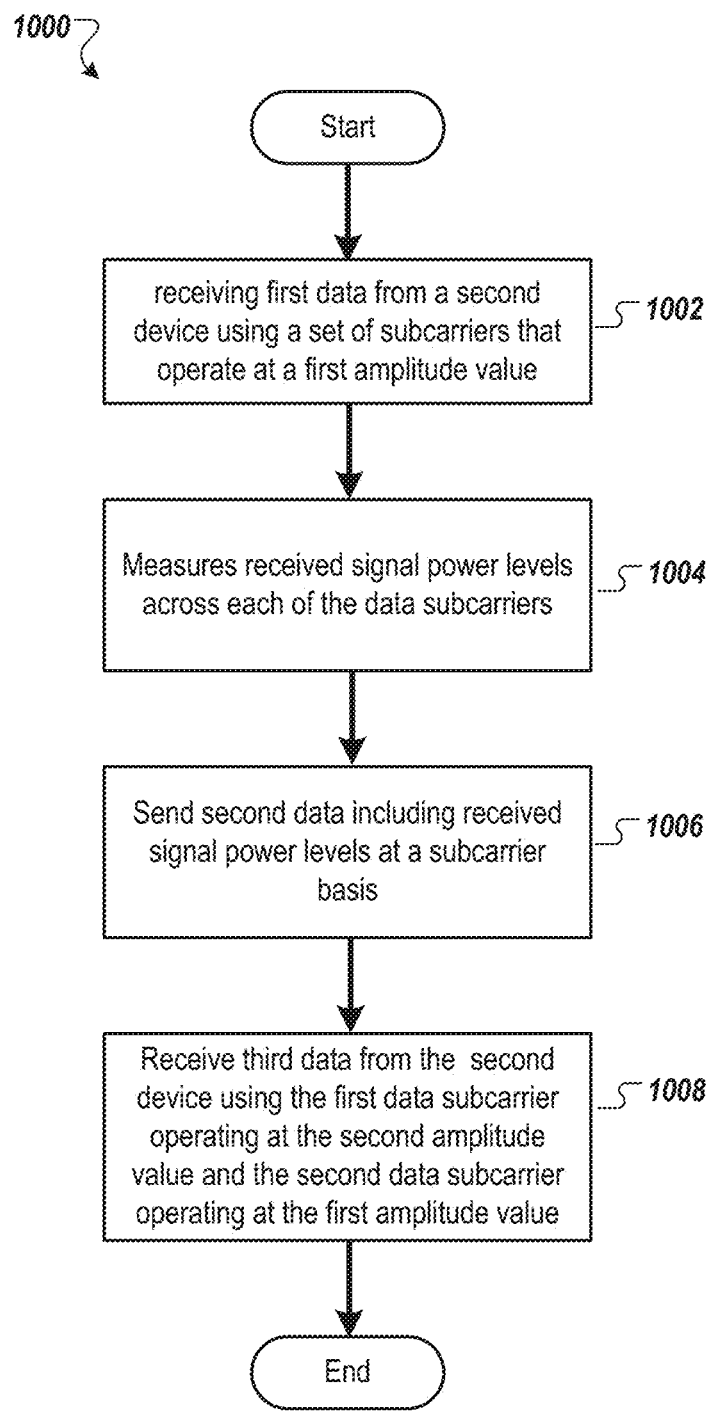
FIG. 10 is a flow diagram of a method for measuring received signal power levels on a per subcarrier basis for adjusting amplitudes of a subset of data subcarriers according to one embodiment.

FIG. 10 is a flow diagram of a method 1000 for measuring received signal power levels on a per subcarrier basis for adjusting amplitudes of a subset of data subcarriers according to one embodiment. The method 1000 may be implemented using processing logic comprising hardware, software, firmware, or any combination thereof. In one embodiment, the estimation logic 202 of FIG. 2 implements the method 1000. Alternatively, the receiver or first device as described herein implements the method 1000.

Referring to FIG. 10, the processing logic of a first device begins by receiving first data from a second device using a set of data subcarriers that operate at a first amplitude value (block 1002). For example, a first data subcarrier and a second data subcarrier of the set of data subcarriers operate at a first amplitude value. At block 1004, the processing logic measures a first received signal power level corresponding to the first data subcarrier and a second received signal power level corresponding to the second data subcarrier. The processing logic sends second data to the second device, the second data including feedback regarding the received signal power level at a subcarrier basis (block 1006). In at least one embodiment, the second data includes a first value indicative of a first received signal power level corresponding to the first data subcarrier and a second value indicative of a second received signal power level corresponding to the second data subcarrier. The first value causes the second device to increase the first amplitude value to a second amplitude value for the first data subcarrier. The second value causes the second device to maintain the first amplitude value for the second data subcarrier. The processing logic receives third data from the second device using the first data subcarrier operating at the second amplitude value and the second data subcarrier operating at the first amplitude value (block 1008), and the method 1000 ends.

In at least one embodiment, the processing logic receives the first and third data via a first receiver in a SISO mode. In at least one embodiment, the processing logic receives the first and third data via two or more receivers in a MIMO mode.

In at least one embodiment, the processing logic receives RF signals at a first receiver and a second receiver. The processing logic measures a first FFT response of the RF signals across the set of data subcarriers at the first receiver and a second FFT response of the RF signals across the set of data subcarriers at the second receiver. The processing logic determines, from the first FFT and second FFT responses, the first received signal power level corresponding to the first data subcarrier. The processing logic determines that the first receive signal power level is lower than a threshold value. In at least one embodiment, the threshold value represents a frequency selective fading characteristic of the wireless channel. The processing logic generates a first gain code coefficient for the first value. The first gain coefficient is greater than a second gain coefficient for the second value. In at least one embodiment, the processing logic sends the first gain code and the second gain code to the second device, causing the second device to adjust the amplitude value for the first data subcarrier as described herein.

In at least one embodiment, the processing logic measures a first FFT response of the RF signals across the set of data subcarriers at the first receiver and a second FFT response of the RF signals across the set of data subcarriers at the second receiver. For each data subcarrier of the set of data subcarriers, the processing logic determines whether the first FFT response is less than the second FFT response by a threshold amount. The threshold amount represents a frequency selective fading characteristic in the wireless channel. The processing logic generates and sends the second data to the second device. The second data causes the second device to increase the first amplitude value to the second amplitude value for the first transmitter. Alternatively, the processing logic generates and sends the second data to the second device to increase the first amplitude value to the second amplitude value for the second transmitter. Alternatively, the processing logic generates and sends the second data to the second device to increase the first amplitude value to the second amplitude value for the first transmitter and the second transmitter.

Figure 11:
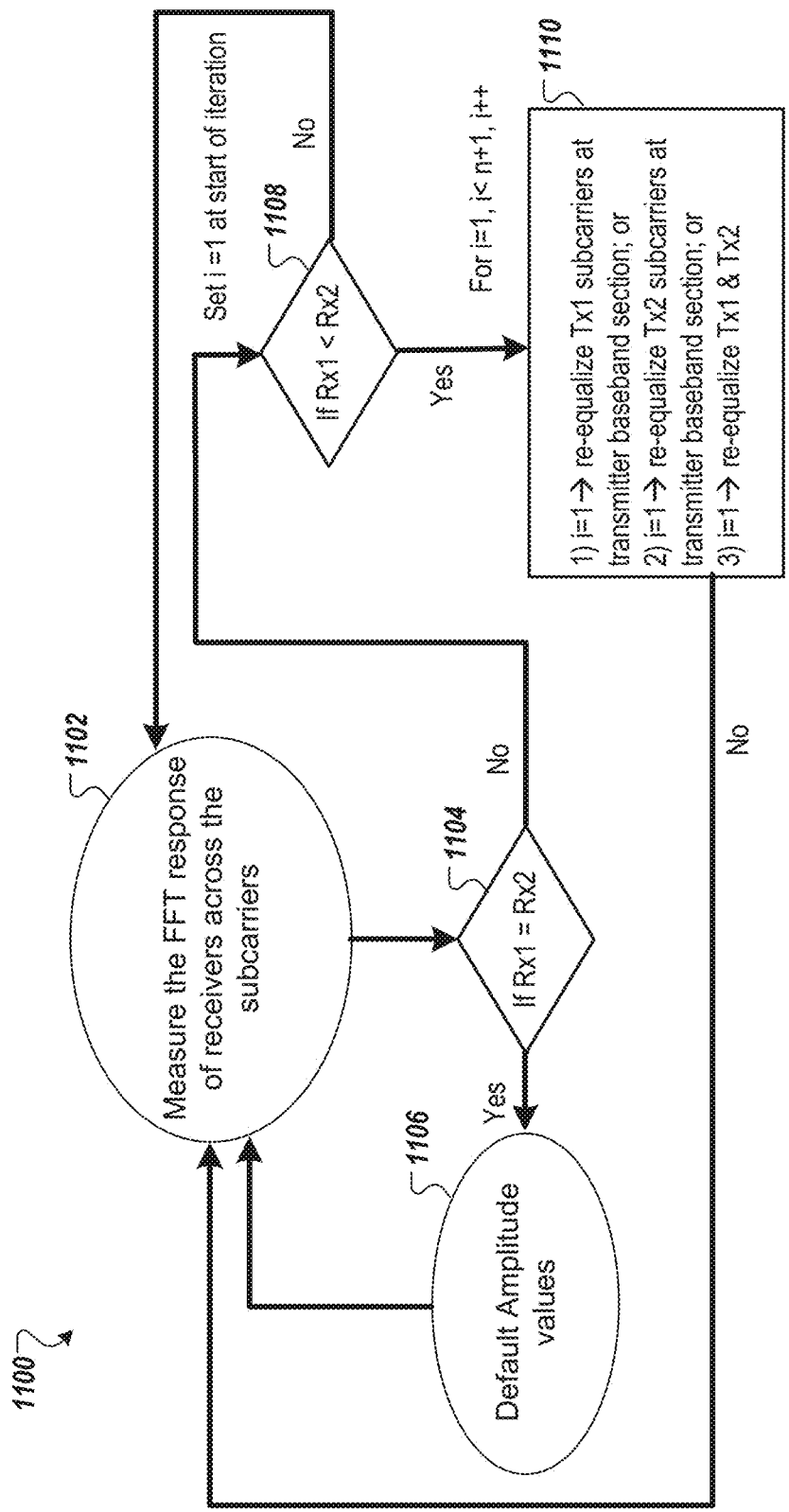
FIG. 11 is a flow diagram of a subcarrier pre-equalization method according to one embodiment.

FIG. 11 is a flow diagram of a subcarrier pre-equalization method 1100 according to one embodiment. The method 1100 may be implemented using processing logic comprising hardware, software, firmware, or any combination thereof. In one embodiment, the estimation logic 202 of FIG. 2 implements the method 1100. Alternatively, the receiver or first device as described herein implements the method 1100.

Referring to FIG. 11, the processing logic of a first device begins by measuring the FFT response of each receiver (e.g., Rx1/Rx2) across the subcarriers (block 1102). The processing logic determines if the FFT responses are similar for the receivers (e.g., Rx1=Rx2 or within a threshold range) (block 1104). If the FFT responses are similar for the receivers, the processing logic can use the default amplitude values (block 1106). The processing logic can return to measure the FFT response periodically and check if the FFT responses are still similar. In response to a determination at block 1104 that the FFT response is not similar for the receivers, the processing logic sets an index, i, equal to 1 at a start of a sequence of iterations. The processing logic determines whether the FFT response for a first receiver (Rx1) is less than the FFT response for a second receiver (Rx2). For example, a threshold amount can be defined and if the Rx1 is less than the Rx2 by more than the threshold amount, the processing logic can perform subcarrier pre-equalization at block 1110. If the Rx1 is not less than the Rx2, the processing logic returns to block 1102. At a first iteration at block 1110, the processing logic re-equalizes subcarriers at a transmitter baseband section of a first transmitter. At a second iteration at block 1110, the processing logic re-equalizes subcarriers at a transmitter baseband section of a second transmitter. At a third iteration at block 1110, the processing logic re-equalizes subcarriers at the transmitter baseband sections of the first transmitter and the second transmitter. After each iteration, the processing logic returns to measure the receivers' FFT response across the subcarriers at block 1102.

Figure 12:
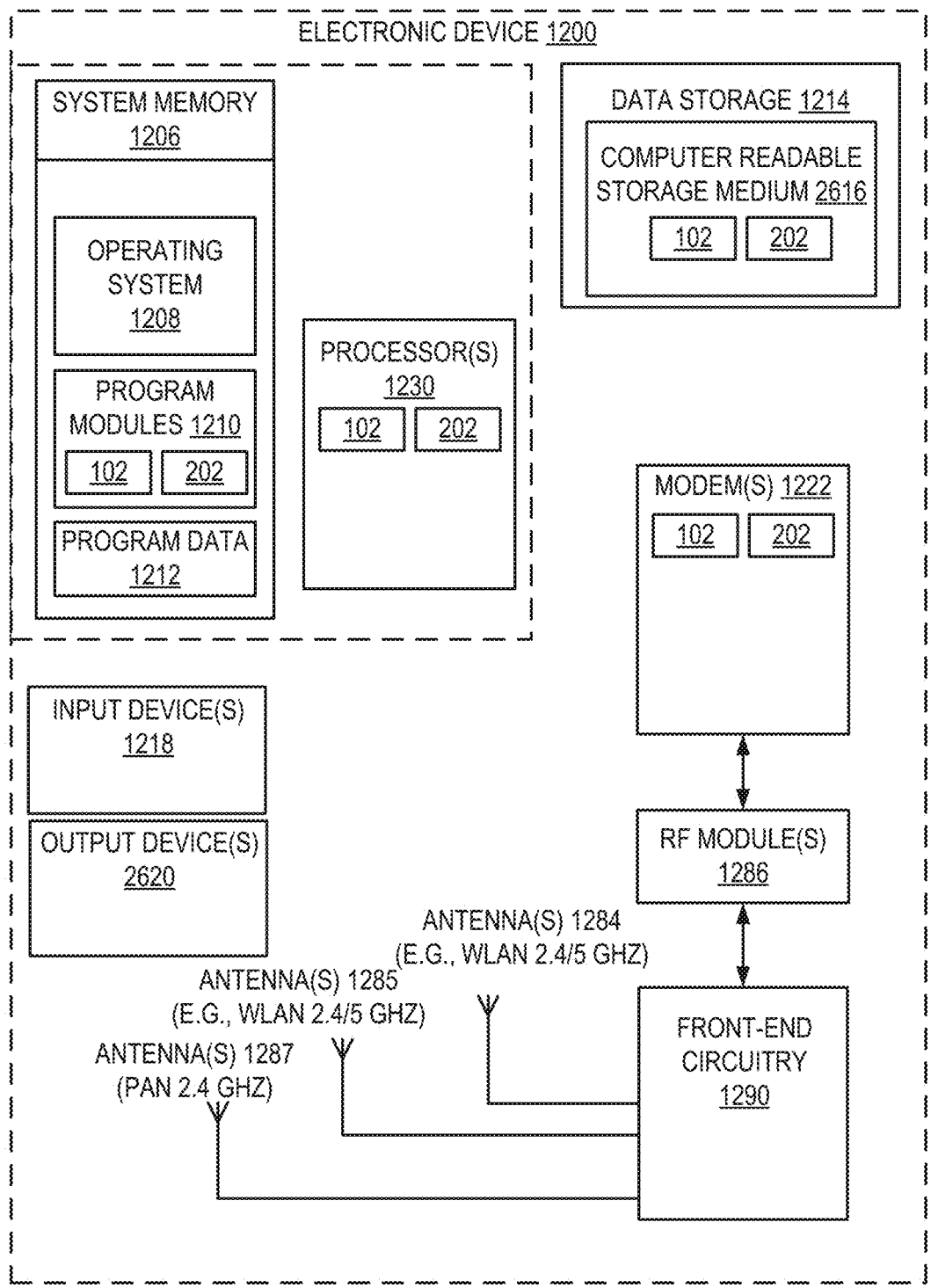
FIG. 12 is a block diagram of an electronic device in which embodiments of subcarrier pre-equalization logic and estimation logic may be implemented.

FIG. 12 is a block diagram of an electronic device 1200 in which embodiments of subcarrier pre-equalization logic 102 and estimation logic 202 may be implemented. The electronic device 1200 may correspond to the electronic device 100 of FIG. 1 or electronic device 200 of FIG. 2. The electronic device 1200 may be any type of computing devices such as an electronic book reader, a PDA, a mobile phone, a laptop computer, a portable media player, a tablet computer, a camera, a video camera, a netbook, a desktop computer, a gaming console, a DVD player, Bluray® player, a computing pad, a media center, an audio-input-enabled device, a speech-based personal data assistant, and the like. The electronic device 1200 may be any portable or stationary user device. For example, the electronic device 1200 may be an intelligent voice control and speaker system. Alternatively, the electronic device 1200 can be any other device used in a WLAN network (e.g., Wi-Fi® network), a WAN network, or the like.

The electronic device 1200 includes one or more processor(s) 1230, such as one or more CPUs, microcontrollers, field-programmable gate arrays, or other types of processing devices. The electronic device 1200 also includes system memory 1206, which may correspond to any combination of volatile and/or non-volatile storage mechanisms. The system memory 1206 stores information that provides operating system component 1208, various program modules 1210 such as the subcarrier pre-equalization logic 102 and estimation logic 202 described herein, program data 1212, and/or other components. In one embodiment, the system memory 1206 stores instructions of the methods as described herein. The electronic device 1200 performs functions by using the processor(s) 1230 to execute instructions provided by the system memory 1206.

The electronic device 1200 also includes a data storage device 1214 that may be composed of one or more removable storage types and/or one or more types of non-removable storage. The data storage device 1214 includes a computer-readable storage medium 1216 on which is stored one or more sets of instructions embodying any of the methodologies or functions described herein, such as the subcarrier pre-equalization logic 102 and estimation logic 202 described herein. Instructions for the program modules 1210 may reside, completely or at least partially, within the computer-readable storage medium 1216, system memory 1206 and/or within the processor(s) 1230 during execution thereof by the electronic device 1200, the system memory 1206 and the processor(s) 1230 also constituting computer-readable media. The electronic device 1200 may also include one or more input devices 1218 (keyboard, mouse device, specialized selection keys, etc.) and one or more output devices 1220 (displays, printers, audio output mechanisms, etc.).

The electronic device 1200 further includes a modem 1222 to allow the electronic device 1200 to communicate via a wireless network (e.g., such as provided by the wireless communication system) with other computing devices, such as remote computers, an item providing system, and so forth. The modem 1222 can be connected to one or more radios 1286. The modem can include the subcarrier pre-equalization logic 102 and estimation logic 202 described herein. The radios may include a WLAN radio, a WAN radio, PAN radio, or the like, as described herein. Antennas 1288 are coupled to the radios 1286, which are coupled to the modem 1222. The antennas 1288 may include a first WLAN antenna and a second WLAN antenna, and a PAN antenna as described herein. Additional antennas may be used and may be GPS antennas, NFC antennas, other WAN antennas, WLAN or PAN antennas, or the like. The modem 1222 allows the electronic device 1200 to handle both voice and non-voice communications (such as communications for text messages, multi-media messages, media downloads, web browsing, etc.) with a wireless communication system. The modem 1222 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1222 may generate signals and send these signals to antennas 1288, via RF radio(s) 1286 as described herein. Electronic device 1200 may additionally include a WLAN radio, a GPS receiver, a PAN transceiver, and/or other RF radios. These RF radios may additionally or alternatively be connected to one or more of antennas 1288. Antennas 1288 may be configured to transmit in different frequency bands and/or using different wireless communication protocols. The antennas 1288 may be directional, omnidirectional, or non-directional antennas. In addition to sending data, antennas 1288 may also receive data, which is sent to appropriate RF radios connected to the antennas.

In one embodiment, the electronic device 1200 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 1222 is shown to control transmission and reception via antenna 1288, the electronic device 1200 may alternatively include multiple modems, each of which is configured to transmit/receive data via a different antenna and/or wireless transmission protocol.

The electronic device 1200 delivers and/or receives items, upgrades, and/or other information via the network. For example, the electronic device 1200 may download or receive items from an item-providing system. The item providing system receives various requests, instructions and other data from the electronic device 1200 via the network. The item-providing system may include one or more machines (e.g., one or more server computer systems, routers, gateways, etc.) with processing and storage capabilities to provide the above functionality. Communication between the item-providing system and the electronic device 1200 may be enabled via any communication infrastructure. One example of such an infrastructure includes a combination of a wide area network (WAN) and wireless infrastructure, which allows a user to use the electronic device 1200 to purchase items and consume items without being tethered to the item providing system via hardwired links. The wireless infrastructure may be provided by one or multiple wireless communications systems, such as one or more wireless communications systems. One wireless communication system may be a wireless local area network (WLAN) hotspot connected with the network. The WLAN hotspots can be created by products using the Wi-Fi® technology based on IEEE 802.11x standards by Wi-Fi Alliance. Another wireless communication system may be a wireless carrier system that can be implemented using various data processing equipment, communication towers, etc. Alternatively, or in addition, the wireless carrier system may rely on satellite technology to exchange information with the electronic device 1200.

The communication infrastructure may also include a communication-enabling system that serves as an intermediary in passing information between the item-providing system and the wireless communication system. The communication-enabling system may communicate with the wireless communication system (e.g., a wireless carrier) via a dedicated channel, and may communicate with the item-providing system via a non-dedicated communication mechanism, e.g., a public Wide Area Network (WAN) such as the Internet.

The electronic devices 1200 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The electronic devices 1200 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
    sending, by a first device to a second device, first data using a digital multi-carrier modulation scheme that defines a set of data subcarriers in a wireless channel, wherein a first data subcarrier and a second data subcarrier of the set of data subcarriers operate at a first amplitude value;
    receiving, by the first device from the second device, second data comprising a first value indicative of a first received signal power level corresponding to the first data subcarrier and a second value indicative of a second received signal power level corresponding to the second data subcarrier;
    determining, by the first device, a second amplitude value for the first data subcarrier based on the first value;
    generating a modulation symbol using input bits of third data;
    converting the modulation symbol into discrete time-domain data, wherein the first amplitude value is increased to a second amplitude value for the first data subcarrier before the converting;
    converting the discrete time-domain data into analog data;
    modulating the analog data onto radio frequency (RF) signals; and
    sending, by the first device to the second device using the RF signals, the third data using the digital multi-carrier modulation scheme in which the first data subcarrier operates at the second amplitude value and the second data subcarrier operates at the first amplitude value.

2. The method of claim 1, further comprising:
    generating, using input bits of the first data, quadrature amplitude modulation (QAM) symbols; and
    generating, using the QAM symbols, the third data, wherein the third data is discrete time-domain data, wherein generating the third data comprises performing an inverse fast Fourier transform (IFFT) of the QAM symbols, and wherein the second amplitude value is determined before the IFFT of the QAM symbols corresponding to the third data.

3. The method of claim 1, wherein the first value is a first gain code coefficient generated by the second device, wherein the second value is a second gain code coefficient generated by the second device.

4. The method of claim 1, wherein sending the first data comprises sending the first data via a first transmitter in a single-input-single-output (SISO) mode, and wherein sending the third data comprises sending the third data via the first transmitter in the SISO mode.

5. The method of claim 1, wherein sending the first data comprises sending the first data via a first transmitter and a second transmitter in a multiple-input-multiple-output (MIMO) mode, and wherein sending the third data comprises sending the third data via the first transmitter and the second transmitter in the MIMO mode.

6. A method comprising:
receiving, by a first receiver and a second receiver of a first device from a second device, first data using radio frequency (RF) signals modulated according to a digital multi-carrier modulation scheme that defines a set of data subcarriers in a wireless channel, wherein a first data subcarrier and a second data subcarrier of the set of data subcarriers operate at a first amplitude value;
measuring a first fast Fourier transform (FFT) response of the RF signals across the set of data subcarriers at the first receiver and a second FFT response of the RF signals across the set of data subcarriers at the second receiver;
determining, by the first device from the first FFT response and the second FFT response, a first received signal power level corresponding to the first data subcarrier and a second received signal power level corresponding to the second data subcarrier;
generating a first value based on the first received signal power level being lower than a threshold value and a second value based on the second received signal power level not being lower than the threshold value, the threshold value representing a frequency selective fading characteristic of the wireless channel;
sending, by the first device to the second device, second data comprising the first value indicative of the first received signal power level corresponding to the first data subcarrier and the second value indicative of a second received signal power level corresponding to the second data subcarrier; and
receiving, by the first device from the second device, third data using the digital multi-carrier modulation scheme in which the first data subcarrier operates at a second amplitude value and the second data subcarrier operates at the first amplitude value.

7. The method of claim 6, wherein receiving the first data comprises receiving the first data via a first receiver in a single-input-single-output (SISO) mode, and wherein receiving the third data comprises receiving the third data via the first receiver in the SISO mode.

8. The method of claim 6, wherein receiving the first data comprises receiving the first data via a first receiver and a second receiver in a multiple-input-multiple-output (MIMO) mode, and wherein receiving the third data comprises receiving the third data via the first receiver and the second receiver in the MIMO mode.

9. A first device comprising:
a baseband processor comprising:
Orthogonal Frequency Division Multiplexing (OFDM) circuitry, wherein the OFDM circuitry uses a digital multi-carrier modulation scheme that defines a set of data subcarriers, a set of pilot subcarriers, and a direct current (DC) subcarrier; and
subcarrier pre-equalization digital signal processing (DSP) logic;
a modulator coupled to the baseband processor; and
a power amplifier coupled to the modulator, wherein the subcarrier pre-equalization DSP logic is configured to:
receive, from a second device, first data indicative of a frequency selective fading characteristic of a wireless channel between the first device and the second device; and
change a first amplitude value of a subset of the set of data subcarriers to a second amplitude value, which removes the frequency selective fading characteristic of the wireless channel, wherein the OFDM circuitry is configured to:
generate a modulation symbol using input bits of second data;
convert the modulation symbol into discrete time-domain data, wherein the first amplitude value is adjusted to the second amplitude value before a conversion of the modulation symbol; and
convert the discrete time-domain data into analog data, wherein the modulator is to modulate the analog data onto RF signals, and the power amplifier is to amplify and send the RF signals.

10. The first device of claim 9, further comprising:
second OFDM circuitry; and
second subcarrier pre-equalization DSP logic;
a second modulator coupled to the second OFDM circuitry; and
a second power amplifier coupled to the second modulator, wherein the baseband processor operates in multiple-input-multiple-output (MIMO) mode.

11. The first device of claim 9, wherein the OFDM circuitry:
generates, using input bits of second data, quadrature amplitude modulation (QAM) symbols; and
generates, using the QAM symbols, the second data, wherein the second data is discrete time-domain data.

12. The first device of claim 9, further comprising:
a first receiver and a second receiver to receive radio frequency (RF) signals from a third device, wherein the modulator and the power amplifier are part of a transmitter; and
estimation logic coupled to the first receiver and the second receiver, wherein the estimation logic is to:
generate second data indicative of a frequency selective fading characteristic of a wireless channel between the first device and the third device; and
send the second data to the third device.

13. The first device of claim 9, further comprising:
a first receiver to receive radio frequency (RF) signals from a third device, wherein the modulator and the power amplifier are part of a transmitter; and
estimation logic coupled to the first receiver, wherein the estimation logic is to:
generate second data indicative of a frequency selective fading characteristic of a wireless channel between the first device and the third device; and
send the second data to the third device.

14. The first device of claim 9, further comprising a first transmitter to send second data to the second device in a single-input-single-output (SISO) mode.

15. The first device of claim 9, further comprising a first transmitter and a second transmitter to second data to the second device in a multiple-input-multiple-output (MIMO) mode.

16. A first device comprising:
first radio frequency (RF) circuitry; and
first baseband circuitry coupled to the first RF circuitry, wherein the first baseband circuitry:
generates first quadrature amplitude modulation (QAM) symbols;
performs an inverse fast Fourier transform (IFFT) of the first QAM symbols to generate first data using a digital multi-carrier modulation scheme that defines a set of data subcarriers in a wireless channel, wherein a first data subcarrier and a second data subcarrier of the set of data subcarriers operate at a first amplitude value;
sends the first data, via the first RF circuitry, to a second device;

receives, from the second device, second data comprising a first value indicative of a first received signal power level corresponding to the first data subcarrier and a second value indicative of a second received signal power level corresponding to the second data subcarrier;

determines, using the first value, a second amplitude value for at least the first data subcarrier based on the first value; and performs an IFFT of second QAM symbols to generate third data, wherein the second amplitude value is determined before the IFFT of the second QAM symbols corresponding to the third data.

17. The first device of claim 16, wherein the first baseband circuitry comprising digital signal processing (DSP) logic to determine the second amplitude value before the IFFT of the second QAM symbols, wherein:

the first baseband circuitry performs bit-level processing on input bits to generate the second QAM symbols;

the first baseband circuitry performs symbol-level processing, including the IFFT, on the second QAM symbols to generate the third data;

the third data is discrete time-domain data; and the first amplitude value is increased to the second amplitude value for the first data subcarrier before the IFFT of the second QAM symbols.

18. The first device of claim 16, wherein the second data indicates that a subset of the set of data subcarriers has power levels that are lower than a threshold value, the threshold value representing a frequency selecting fading characteristics of the wireless channel, and wherein the second value is based on the second data subcarrier having a power level that is not lower than the threshold value.

* * * * *